United States Patent
Natsuda et al.

(10) Patent No.: US 10,618,125 B2
(45) Date of Patent: Apr. 14, 2020

(54) GEAR CUTTING TOOL, GEAR MACHINING DEVICE, AND GEAR MACHINING METHOD

(71) Applicant: JTEKT CORPORATION, Osaka-shi (JP)

(72) Inventors: Kazuki Natsuda, Kitanagoya (JP); Hisashi Otani, Anjo (JP); Hiroyuki Nakano, Tokai (JP); Yoshimitsu Okada, Kariya (JP)

(73) Assignee: JTEKT CORPORATION, Osaka-shi (JP)

( * ) Notice: Subject to any disclaimer, the term of this patent is extended or adjusted under 35 U.S.C. 154(b) by 69 days.

(21) Appl. No.: 15/631,513

(22) Filed: Jun. 23, 2017

(65) Prior Publication Data

US 2018/0001405 A1    Jan. 4, 2018

(30) Foreign Application Priority Data

| Jul. 1, 2016 | (JP) | ................................. 2016-131376 |
| Aug. 10, 2016 | (JP) | ................................. 2016-157718 |
| Aug. 10, 2016 | (JP) | ................................. 2016-157866 |

(51) Int. Cl.
  *B23Q 11/10*   (2006.01)
  *B23F 23/12*   (2006.01)
  (Continued)

(52) U.S. Cl.
  CPC .......... *B23F 23/12* (2013.01); *B23B 2240/24* (2013.01); *B23F 5/163* (2013.01); *B23F 21/08* (2013.01);
  (Continued)

(58) Field of Classification Search
  CPC .......... B23F 5/163; B23F 21/04; B23F 21/08; B23F 21/10; B23F 23/1287; Y10T 407/1735; Y10T 407/174; B23B 2240/24; B23Q 11/1015; B23Q 11/1023; B23Q 11/1076
  See application file for complete search history.

(56) References Cited

U.S. PATENT DOCUMENTS

| 579,570 A | * | 3/1897 | Fellows | ................... B23F 21/10 407/28 |
| 2,644,367 A | * | 7/1953 | Praeg | ........................ B23F 5/12 407/28 |

(Continued)

FOREIGN PATENT DOCUMENTS

| DE | 4033607 A1 | * 4/1992 | ............... B23C 5/10 |
| JP | 51-65481 | 6/1976 | |

(Continued)

*Primary Examiner* — Alan Snyder
*Assistant Examiner* — Yasir A Diab
(74) *Attorney, Agent, or Firm* — Oblon, McClelland, Maier & Neustadt, L.L.P.

(57) ABSTRACT

To provide a gear cutting tool capable of supplying a coolant liquid to an optimum position even when cutting edges are reground. The gear cutting tool includes the tool body having a plurality of blades on an outer peripheral surface thereof and a center hole, and a nozzle provided in the center hole of the tool body so that a fixed position in the tool body is adjustable. The nozzle includes a flow channel which allows supplied coolant liquid to flow into the center hole of the tool body, and discharge the coolant liquid toward the plurality of blades.

4 Claims, 14 Drawing Sheets

(51) Int. Cl.
   *B23F 21/08*    (2006.01)
   *B23F 5/16*    (2006.01)
   *B23F 21/10*    (2006.01)

(52) U.S. Cl.
   CPC ........... *B23F 21/10* (2013.01); *B23F 23/1287* (2013.01); *B23Q 11/1023* (2013.01); *B23Q 11/1076* (2013.01)

(56) References Cited

U.S. PATENT DOCUMENTS

| | | | | |
|---|---|---|---|---|
| 2,867,140 A | * | 1/1959 | Getts | B23B 51/0486 408/143 |
| 3,089,392 A | * | 5/1963 | Romi | B23F 5/202 409/36 |
| 3,803,977 A | * | 4/1974 | Psenka | B23F 5/16 409/37 |
| 4,066,001 A | * | 1/1978 | Nishijima | B23F 5/163 407/28 |
| 4,673,317 A | * | 6/1987 | Haug | B23F 21/106 407/28 |
| 4,784,538 A | * | 11/1988 | Tlaker | B23F 21/10 407/28 |
| 6,450,738 B1 | * | 9/2002 | Ripley | B23C 5/28 407/35 |
| 2005/0129474 A1 | * | 6/2005 | Winfough | B23Q 5/261 409/36 |
| 2009/0226268 A1 | * | 9/2009 | Pilkington | B23C 5/28 407/113 |
| 2012/0275876 A1 | * | 11/2012 | Lehto | B23C 5/26 409/137 |
| 2014/0234043 A1 | * | 8/2014 | Nakahara | B23F 5/20 409/12 |
| 2015/0078851 A1 | * | 3/2015 | Liepelt | B23F 5/163 409/38 |
| 2017/0072485 A1 | * | 3/2017 | Weppelmann | B23F 21/005 |

FOREIGN PATENT DOCUMENTS

| | | | | |
|---|---|---|---|---|
| JP | 63-763 U | | 1/1988 | |
| JP | 2000-280119 | | 10/2000 | |
| JP | 2001138107 A | * | 5/2001 | |
| JP | 2005262419 A | * | 9/2005 | |
| JP | 2012-115940 | | 6/2012 | |
| JP | 2013-169621 | | 9/2013 | |
| JP | 2014-155990 | | 8/2014 | |
| JP | 2015-58505 | | 3/2015 | |
| JP | 2015-164751 | | 9/2015 | |
| SU | 876372 A1 | * | 10/1981 | ............. B23Q 11/10 |
| SU | 1298044 A2 | * | 3/1987 | ........... B23Q 1/0036 |
| WO | WO 2015185186 A1 | * | 12/2015 | ............ B23F 21/005 |

* cited by examiner

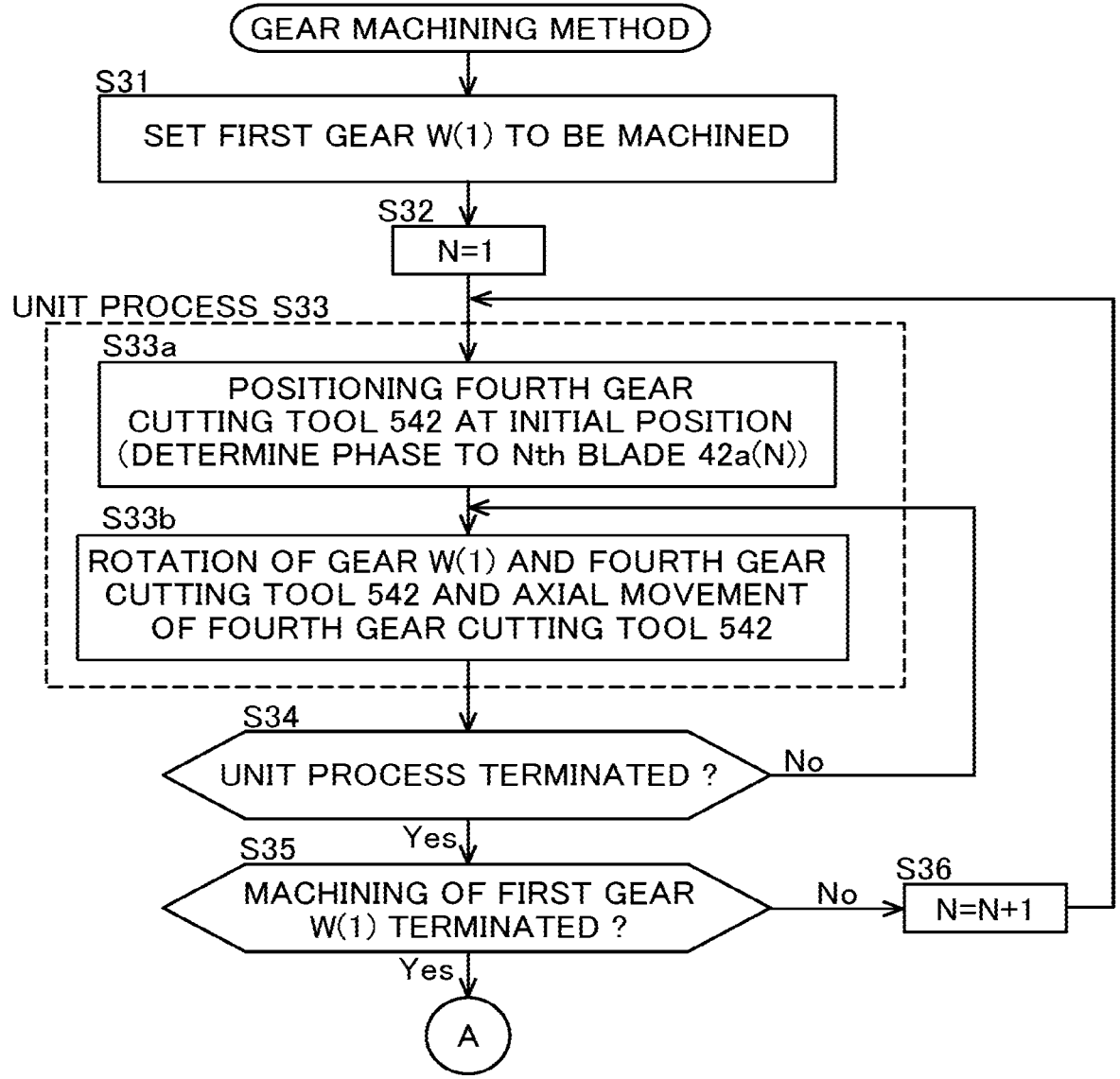

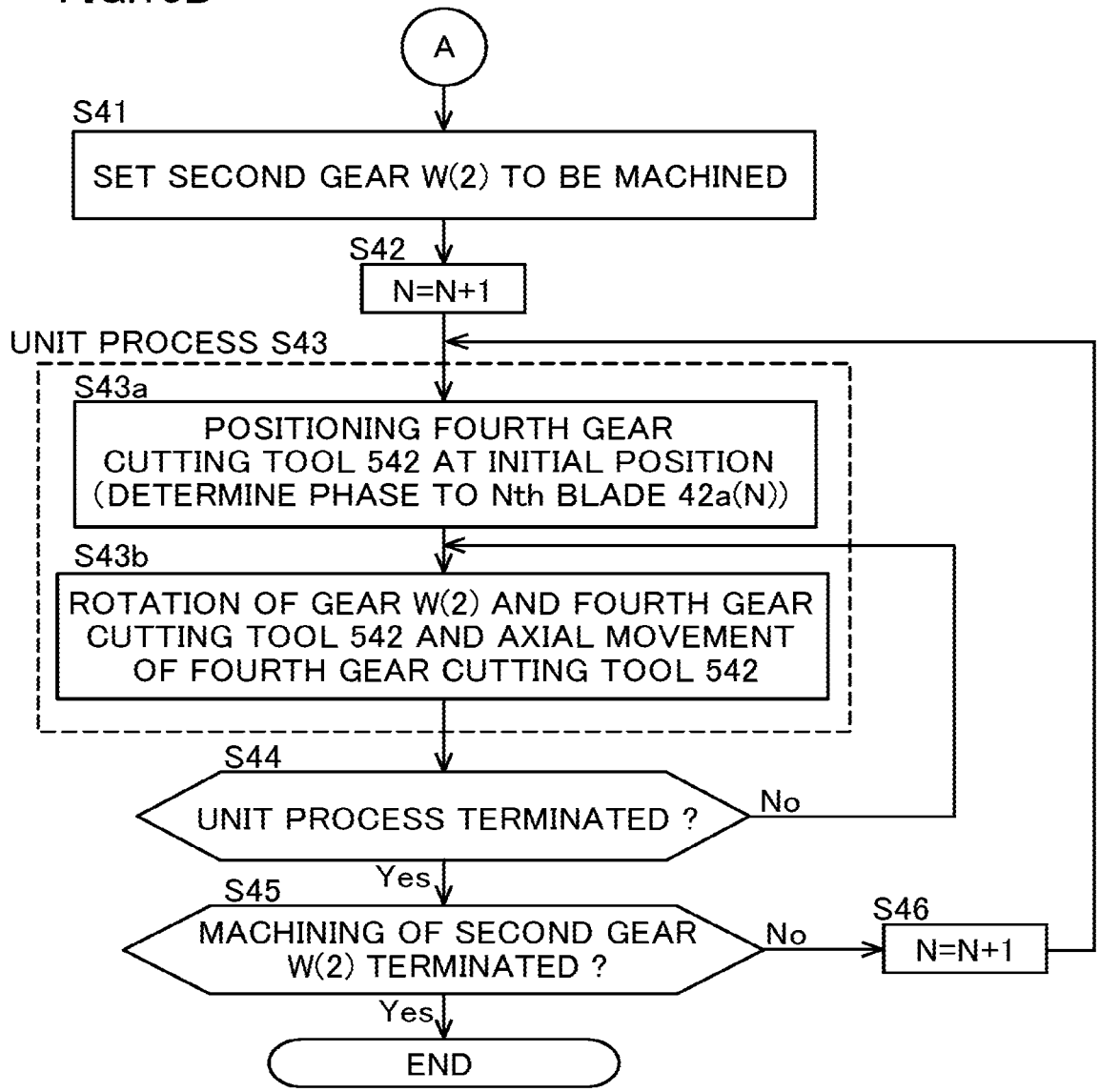

GEAR CUTTING TOOL, GEAR MACHINING DEVICE, AND GEAR MACHINING METHOD

CROSS REFERENCE TO RELATED APPLICATIONS

This application claims priority based on Japanese Patent Application No. 2016-131376 filed on Jul. 1, 2016, Japanese Patent Application No. 2016-157718 filed on Aug. 10, 2016, and Japanese Patent Application No. 2016-157866 filed on Aug. 10, 2016, the entire contents of which are incorporated by reference herein.

TECHNICAL FIELD

The present invention relates to a gear cutting tool, a gear machining device, and a gear machining method.

BACKGROUND ART

A gear shaper machining using a pinion cutter described in JP2012-115940A and a skiving using skiving cutters described in JP2015-058505A and JP2014-155990A are known as a gear machining method using a gear cutting tool. The gear cutting tool such as the pinion cutter and the skiving cutter is provided with cutting blades which are able to cut out a gear (workpiece).

A gear cutting tool having a discharge port on a center side thereof is described in JP2015-164751A. The gear cutting tool is configured to discharge a coolant liquid from the discharge port positioned on the center side of the gear cutting tool toward blades positioned on an outer peripheral side thereof. Consequently, chips generating during machining of the gear may be removed from a cutting portion by the coolant liquid discharged therefrom.

A gear cutting tool provided with filling ports formed in rake faces of a plurality of blades on the outer peripheral side thereof is described in JP51-65481A. A coolant liquid is supplied from the filling ports. In addition, a grind stone structure having a channel configured to supply a coolant liquid into an interior of a grind stone is described in JP-UM-A-63-763.

Here, the gear machining repeats intermittent machining, and thus the gear cutting tool reaches the end of its life earlier due to wear, chipping and the like of blades of the gear cutting tool. Accordingly, in JP2013-169621A and in JP2000-280119A, various ideas for elongation of a service life of the gear cutting tool are devised.

SUMMARY OF INVENTION

Problems to be Solved by Invention

In the gear cutting tool, cutting edges are worn by machining, and thus the cutting edges are reground into a desired shape. By regrinding the cutting edges, the positions of the cutting edges change. However, in JP2015-164751A, the discharge ports for a coolant liquid, being formed at fixed positions on the center side, do not support a change in the positions of the cutting edges. Therefore, when the cutting edges are reground, there arises a problem that the coolant liquid cannot be supplied to optimal positions.

It is one of objects of the present invention to provide a gear cutting tool being capable of supplying a coolant liquid to optimal positions even after cutting edges are reground, and also to provide a gear machining device using the gear cutting tool and a gear machining method using the gear cutting tool.

The gear cutting tool as described above may be subject to a large amount of wear at the cutting edges because of concentration of loads applied thereto from the cutting blades depending on conditions of machining actions when machining a gear. The gear cutting tool is required to be replaced even when wear occurs only part of the cutting edges, and hence elongation of the service life is required.

Another one of the objects of the present invention is to provide a gear cutting tool capable of achieving the elongation of its service life, and a gear machining method using the gear cutting tool.

The gear cutting tool such as a pinion cutter and a skiving cutter includes a plurality of blades. When the load is concentrically applied only to a specific blade, the specific blade is subjected to wear or chipping, and consequently, the gear cutting tool is required to be replaced.

Still another one of the objects of the present invention is to provide a gear machining method capable of achieving elongation of the service life of the gear cutting tool by dispersing the load applied to the blades when the gear cutting tool having a plurality of blades is used.

Means for Solving the Problem

1. Gear Cutting Tool as First Aspect

A gear cutting tool as a first aspect is a gear cutting tool used for machining a gear including: a tool body including the plurality of blades on an outer peripheral surface and a center hole at a center portion thereof; and a nozzle including a flow channel allowing a coolant liquid supplied to the center hole of the tool body to flow therein and discharging the coolant liquid toward the plurality of blades and provided in the center hole of the tool body so that the fixed position thereof in the tool body is adjustable.

According to the gear cutting tool described above, the nozzle in the gear cutting tool is adjustable with respect to the tool body. Therefore, even when the positions of the cutting edges are changed when the plurality of blades of the tool body are reground, the position of the nozzle may be adjusted. In other words, the position where the nozzle discharges the coolant liquid may be adjusted. Therefore, even when the blades are reground, the coolant liquid discharged from the nozzle may be supplied to the optimal positions of the blades.

2. Gear Cutting Tool as Second Aspect

A gear cutting tool as a second aspect is used for machining a gear. A machining action for machining the gear using the gear cutting tool is an action of moving the gear cutting tool relatively to the gear in a direction of a center axis of the gear while rotating the gear cutting tool about the center axis. The gear cutting tool includes a shaft member rotated about the center axis of the gear cutting tool in the machining action, and a blade portion provided on the shaft member coaxially therewith. The blade portion includes a first cutting blade having a rake face facing one side in the direction of the center axis of the blade portion and a second cutting blade having a rake face facing other side in the direction of the center axis of the blade portion.

The gear cutting tool as the second aspect includes the first cutting blade and the second cutting blade on the blade portion. Therefore, even when one of the first cutting blade and the second cutting blade reaches the end of its life time, gear machining using the other one of the first cutting blade and the second cutting blade is still possible. Therefore, elongation of the service life of the gear cutting tool is achieved.

3. Gear Machining Device as Third Aspect

A gear machining device as a third aspect includes: the gear cutting tool described above; a workpiece holder holding a gear to be machined and being capable of rotating about a center axis of the gear; and a rotary main spindle holding the gear cutting tool, being provided so as to be rotatable about the center axis of the gear cutting tool and being movable relatively to the gear in a direction of the center axis of the gear.

According to the gear machining device described above, the nozzle in the gear cutting tool is adjustable with respect to the tool body. Therefore, even when the positions of the cutting edges are changed when the plurality of blades of the tool body are reground, the position of the nozzle may be adjusted. In other words, the position where the nozzle discharges a coolant liquid may be adjusted. Therefore, even when the blades are reground, the coolant liquid discharged from the nozzle may be supplied to the optimal positions of the blades.

4. Gear Machining Method as Fourth Aspect

A gear machining method as a fourth aspect is a gear machining method of machining a gear to be machined using the gear cutting tool described above including machining the gear by the gear cutting tool by moving the gear cutting tool relatively to the gear in a predetermined direction while rotating the gear and the gear cutting tool respectively. Here, a machining step of moving the gear cutting tool relatively to the gear in the predetermined direction once is defined as a unit process. In the plurality of blades of the gear cutting tool, a first blade starting machining in a first unit process is different from a second blade starting machining in a second unit process.

Here, a blade machining the gear to be machined firstly in the unit process, that is, a blade starting machining in the unit process is subjected to the largest load. Therefore, when the unit process is repeated by a plurality of times, if the same blade is the blade used for starting the respective unit processes every time, the corresponding blade is continuously subjected to a large load.

However, according to the gear machining method described above, the first blade starting machining in a first unit process is different from the second blade starting machining in the second unit process. Therefore, in the first unit process, the load of the first blade is the largest. In contrast, in the second unit process, the load of the second blade is the largest. In this manner, since the blade being subjected to a large load is different from one unit process to another, the specific blade is prevented from being applied always with a large load. Therefore, the elongation of the service life of the gear cutting tool is achieved.

5. Gear Machining Method as Fifth Aspect

A gear machining method as a fifth aspect is a method of machining a gear by moving a gear cutting tool having a plurality of blades relatively to the gear in a predetermined direction while rotating the gear to be machined and the gear cutting tool having a plurality of blades respectively. Here, a machining step of moving the gear cutting tool relatively to the gear in the predetermined direction once is defined as a unit process. In the plurality of blades of the gear cutting tool, the first blade starting machining in the first unit process is different from the second blade starting machining in the second unit process. The gear machining method as the fifth aspect has the same advantageous effects as the first gear machining method described above.

BRIEF DESCRIPTION OF DRAWINGS

FIG. 13A is a flowchart of a gear machining method using the fourth gear cutting tool.

FIG. 13B is a flowchart of the gear machining method using the fourth gear cutting tool.

MODES FOR CARRYING OUT THE INVENTION

1. First Embodiment 1-1. Configuration of Gear Machining Device 1

A configuration of a gear machining device 1 will be described with reference to FIG. 1. A 5-axis lateral machining center will be described as an example of the gear machining device 1. In other word, the gear machining device 1 is a device having drive axes including three rectilinear axes (axes X, Y, and Z) orthogonal to each other and two rotation axes (axis A and axis C).

Figure 1:
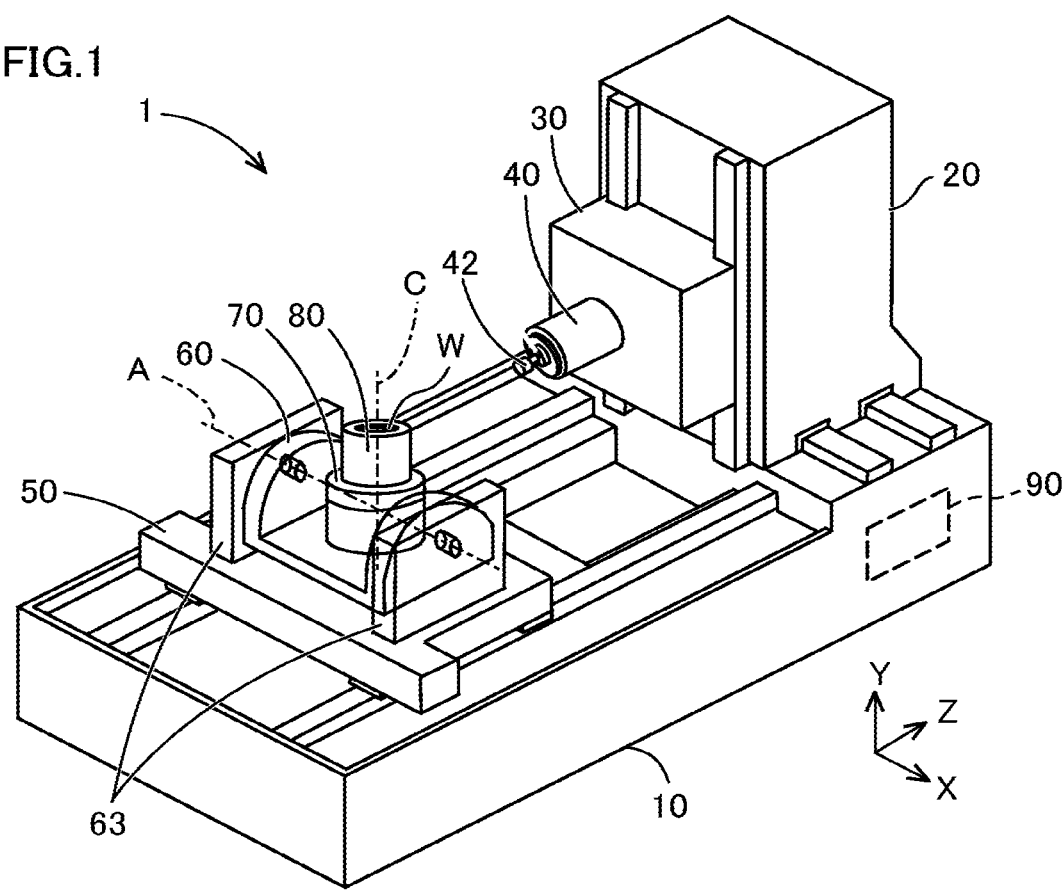
FIG. 1 is a drawing illustrating a gear machining device.

As illustrated in FIG. 1, the gear machining device 1 includes abed 10, a column 20, a saddle 30, a rotary main spindle 40, a first gear cutting tool 42, a sliding table 50, a tilt table 60, a turn table 70, a workpiece holder 80, and a coolant liquid supply device 90. Although illustration is omitted, a known automatic tool replacing device is provided next to the bed 10.

The bed 10 is disposed on a floor. The bed 10 includes the column 20 provided on an upper surface thereof so as to be movable in an X-axis direction (horizontal direction). In addition, the saddle 30 is provided on a side surface of the column 20 so as to be movable in a Y-axis direction (vertical direction). The rotary main spindle 40 is provided so as to be rotatable by a spindle motor (not illustrated) accommodated in the saddle 30.

The first gear cutting tool 42 includes a plurality of blades on an outer peripheral surface thereof. In a first embodiment, the first gear cutting tool 42 is a tool used for skiving. The skiving is a method of machining a gear W by the first gear cutting tool 42 by setting the gear W to be machined and the first gear cutting tool 42 in a state in which an axial line in parallel with a center axis of the gear W extends at an intersection angle with a center axis of the first gear cutting tool 42 (the state in which the center axes intersect in a 3D manner), and moving the first gear cutting tool 42 relatively to the gear W in a direction of the center axis of the gear W while rotating the gear W to be machined and the first gear cutting tool 42, respectively.

The rotary main spindle 40 holds the first gear cutting tool 42 at a distal side thereof. The rotary main spindle 40 is provided so as to be rotatable about the center axis of the first gear cutting tool 42.

The bed 10 also includes the sliding table 50 provided on the upper surface thereof so as to be movable in a Z-axis direction (horizontal direction). The sliding table 50 is provided with tilt table support portions 63 configured to support the tilt table 60 on an upper surface thereof. The tilt table support portions 63 are provided with the tilt table 60 so as to be pivotable about the axis A in the horizontal direction. The tilt table 60 is provided with the turn table 70 so as to be rotatable about the axis C at a right angle with respect to the axis A. The workpiece holder 80 configured to hold the gear W to be machined is mounted on the turn table 70. The workpiece holder 80 may be formed in different shapes depending on whether the gear W to be machined is an internal gear or an external gear.

The coolant liquid supply device 90 supplies a coolant liquid stored in a coolant tank (not illustrated) to the rotary main spindle 40. The coolant liquid supplied to a center hole of the rotary main spindle 40 is supplied to a center hole of the first gear cutting tool 42 via the center hole of the rotary main spindle 40, and is discharged in a radial fashion from a center of the first gear cutting tool 42.

The 5-axis lateral machining center having the configuration described above has been exemplified and described as the gear machining device 1. In addition to it, the gear machining device 1 may have a configuration in which one of the first gear cutting tool 42 and the workpiece holder 80 rotates about the two rotation axes (axis A and axis C). Furthermore, the gear machining device 1 may have a configuration in which one of the first gear cutting tool 42 and the workpiece holder 80 is moved by the three rectilinear axes (axis X, axis Y and axis Z). The gear machining device 1 which may be used includes a vertical type machining center.

The gear machining device 1 has been described with the 5-axis machining center as an example. In addition to it, the gear machining device 1 may be, for example, a gear shaper as long as it can perform the machining action which moves the first gear cutting tool 42 relatively to the gear in the direction of the center axis of the gear W while rotating the first gear cutting tool 42 about the center axis. At this time, for example, the first gear cutting tool 42 is a pinion cutter, and is used for gear shaping.

1-2. A detailed Configuration of First Gear Cutting Tool 42

Figure 2:
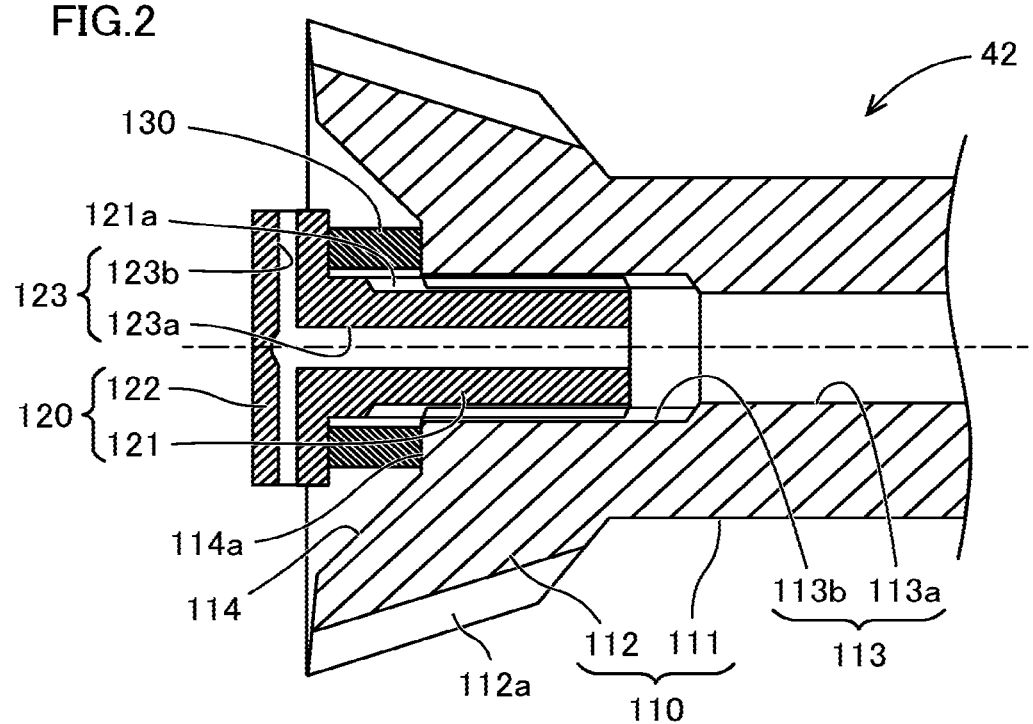
FIG. 2 is a cross-sectional view of a first gear cutting tool of a first embodiment taken along an axial direction.

A detailed configuration of the first gear cutting tool 42 will be described with reference to FIG. 2. As illustrated in FIG. 2, the first gear cutting tool 42 includes a tool body 110, a nozzle 120, and a spacer 130.

The tool body 110 includes a shaft portion (shaft member) 111, and a large-diameter end portion (blade portion) 112 formed integrally at a distal end of the shaft portion 111. In other words, the tool body 110 is formed as a member that has a shaft portion 111 and the large-diameter end portion 112. The tool body 110 may have a configuration including the shaft member composed of the shaft portion 111 and the large-diameter end portion 112 formed separately from the shaft member, and the shaft member and the large-diameter end portion 112 are coupled.

The shaft portion 111 includes a cylindrical outer peripheral surface. A proximal side (right side in FIG. 2) of an outer peripheral surface of the shaft portion 111 is held by the rotary main spindle 40 illustrated in FIG. 1. The shaft portion 111 is arranged coaxially with the rotary main spindle 40.

The large-diameter end portion 112 includes a plurality of blades 112a formed on the outer peripheral surface thereof in a circumferential direction. A torsion angle of the plurality of blades 112a is determined based on a torsion angle of the gear W to be machined and based on an intersection angle between the gear W and the first gear cutting tool 42 at the time of machining. The plurality of blades 112a each includes a rake face at an end surface on a left side of FIG. 2, a front flank at a cutting edge surface, and a side flank on a side surface of the blade. In the first embodiment, a circumscribed surface of tooth crests of the plurality of blades 112a has a conical shape having a front flank at a front relief angle.

The tool body 110 includes a center hole 113 penetrating therethrough in the axial direction. The center hole 113 of the tool body 110 allows a coolant liquid supplied from the coolant liquid supply device 90 to be flowed therein via the center hole of the rotary main spindle 40. The center hole 113 includes a cylindrical inner peripheral surface 113a formed over a major part of the shaft portion 111. In other words, the cylindrical inner peripheral surface 113a of the center hole 113 is formed on the proximal side (right side in FIG. 2) of the tool body 110. In addition, the center hole 113 includes a female screw 113b formed on part of the shaft portion 111 and over a major portion of the large-diameter end portion 112 of the tool body 110. In other words, the female screw 113b is formed on the distal side (left side in FIG. 2) of the tool body 110.

Furthermore, the tool body 110 is provided with a recessed portion 114 at a center on a distal side (left side in FIG. 2). The recessed portion 114 of the tool body 110 has a space having a diameter larger than that of the female screw 113b. The center hole 113 of the tool body 110 opens to the recessed portion 114. The recessed portion 114 includes a mounting seat 114a formed into a flat shape and an annular shape in the periphery of an opening of the female screw 113b.

The nozzle 120 is attached to the center hole 113 of the tool body 110. In addition, a fixed position of the nozzle 120 in the tool body 110 in the axial direction is adjustable. The nozzle 120 includes a shaft portion 121 and a head portion 122 provided at a distal end of the shaft portion 121 and having a larger diameter than the shaft portion 121.

The shaft portion 121 of the nozzle 120 includes a male screw 121a on an outer peripheral surface thereof. The male screw 121a of the shaft portion 121 of the nozzle 120 is screwed into the female screw 113b of the tool body 110. In this manner, the shaft portion 121 is fastened in a state of being inserted into the center hole 113 of the tool body 110. Furthermore, by changing a screwing position between the male screw 121a and the female screw 113b, the fixed position of the nozzle 120 in the tool body 110 becomes adjustable.

The head portion 122 of the nozzle 120 is formed into a disc shape, and has a flat and annular-shaped surface on the shaft portion 121 side. In other words, the corresponding surface of the head portion 122 of the nozzle 120 faces the mounting seat 114a of the tool body 110. The head portion 122 of the nozzle 120 is provided outside an opening of the center hole 113 of the tool body 110. More specifically, part of the head portion 122 of the nozzle 120 is disposed in the recessed portion 114, and other part of the head portion 122 of the nozzle 120 protrudes further outward from the opening on the distal side of the recessed portion 114. The head portion 122 projects further outward from the rake faces of the plurality of blades 112a of the tool body 110.

The nozzle 120 further includes a flow channel 123 in a range from the shaft portion 121 to the head portion 122. A first flow channel 123a, which is part of the flow channel 123, is formed in the shaft portion 121 and is formed so as to extend in the axial direction. Therefore, the first flow channel 123a in the shaft portion 121 allows a coolant liquid supplied into the center hole 113 of the tool body 110 to flow therein.

A second flow channel 123b, which is other part of the flow channel 123, is formed in the head portion 122. The second flow channel 123b communicates with the first flow channel 123a and is formed so as to extend from a center of the head portion 122 toward an outer peripheral surface of the head portion 122. The second flow channel 123b discharges the coolant liquid flowed into the first flow channel 123a radially outward from the outer peripheral surface of the head portion 122.

Specifically, the second flow channel 123b includes a flow channel branched into a plurality (for example, four) of the flow channels from the flow channel at the center of the head portion 122 toward the outer peripheral surface of the head portion 122. Therefore, the coolant liquid flowing through the second flow channel 123b is discharged toward the plurality of blades 112a in a radial fashion. Discharging directions of the second flow channel 123b need only to be directed radially outward, and thus it may be a radiation direction (direction along the radial direction) as described above, or may be directed to directions having an angle with respect to the radiation direction.

The spacer 130 is interposed between the mounting seat 114a of the tool body 110 and the head portion 122 of the nozzle 120 in the axial direction. The spacer 130 is formed into an annular shape. The spacer 130 is inserted into the shaft portion 121 of the nozzle 120. Here, in the first embodiment, the spacer 130 is an annular collar member that does not engage the male screw 121a of the shaft portion 121 of the nozzle 120. In other words, the spacer 130 has a cylindrical inner peripheral surface, and has annular flat surfaces orthogonal to the center axis at both ends thereof.

The cylindrical inner peripheral surface of the spacer 130 has a slight clearance with respect to the outer peripheral surface of the shaft portion 121 of the nozzle 120. In addition, one of the end surfaces of the spacer 130 is in contact with the mounting seat 114a of the tool body 110, and the other end surface of the spacer 130 is in contact with the surface of the head portion 122 of the nozzle 120. In other words, the spacer 130 is interposed between the mounting seat 114a of the tool body 110 and the head portion 122 of the nozzle 120.

In this manner, since the spacer 130 is interposed between the mounting seat 114a of the tool body 110 and the head portion 122 of the nozzle 120 in the axial direction, a length of the spacer 130 in the axial direction is adjusted, so that the nozzle 120 may be adjusted in the fixed position in the center hole 113 of the tool body 110. The spacer 130 is not limited to the annular shape, and may be a simple block shape as long as the position is retained.

1-3. Detailed Configuration of Workpiece Holder 80

Subsequently, a detailed configuration of the workpiece holder 80 will be described with reference to FIG. 3. In the workpiece holder 80 of the first embodiment, the gear W to be machined is described as an internal gear. The workpiece holder 80 includes a main body 81 and a fan 82.

The main body 81 is formed into a cylindrical shape, and is disposed coaxially with the turn table 70. The main body 81 holds the gear W to be machined on an inner peripheral side. More specifically, the main body 81 includes a main body base portion 81a to be fixed to the turn table 70 and a lid portion 81b to be fixed to an end of the main body base portion 81a. In other words, the main body base portion 81a holds the outer peripheral surface of the gear W so that the center axis of the gear W coincides with the center of rotation of the turn table 70. A flange portion of the gear W is interposed between the main body base portion 81a and the lid portion 81b in the axial direction. In this manner, the gear W to be machined is fixed to the main body 81 of the workpiece holder 80.

In addition, the main body 81 includes a plurality of drain ports 81c that communicate cylindrical inner peripheral surface and outer peripheral surface of the main body 81 at positions on the turntable 70 side with respect to the position where the gear W is held (the inner side of the first gear cutting tool 42 in a direction of travel). As described later, the plurality of drain ports 81c correspond to portions from which a coolant liquid and chips discharged from the first gear cutting tool 42 are drained to outside the workpiece holder 80. The plurality of drain ports 81c are formed equidistantly in the circumferential direction.

The fan 82 is disposed radially inside the main body 81 of the workpiece holder 80. The fan 82 is disposed between the cutting portion of the gear W and the drain ports 81c in the axial direction. Furthermore, a center axis of the fan 82 coincides with the center of rotation of the turn table 70. Therefore, the fan 82 rotates about the center axis of the fan 82 in association with the rotation of the turn table 70. The fan 82 rotates to generate a flow of fluid in a direction from the cutting portion of the gear W toward the drain ports 81c. In other words, the fan 82 guides the coolant liquid discharged from the nozzle 120 to the drain ports 81c.

1-4. Gear Cutting Method

Subsequently, a gear cutting method will be described with reference to FIG. 3. In FIG. 3, thick arrows indicate a flowing direction of the coolant liquid.

Figure 3:
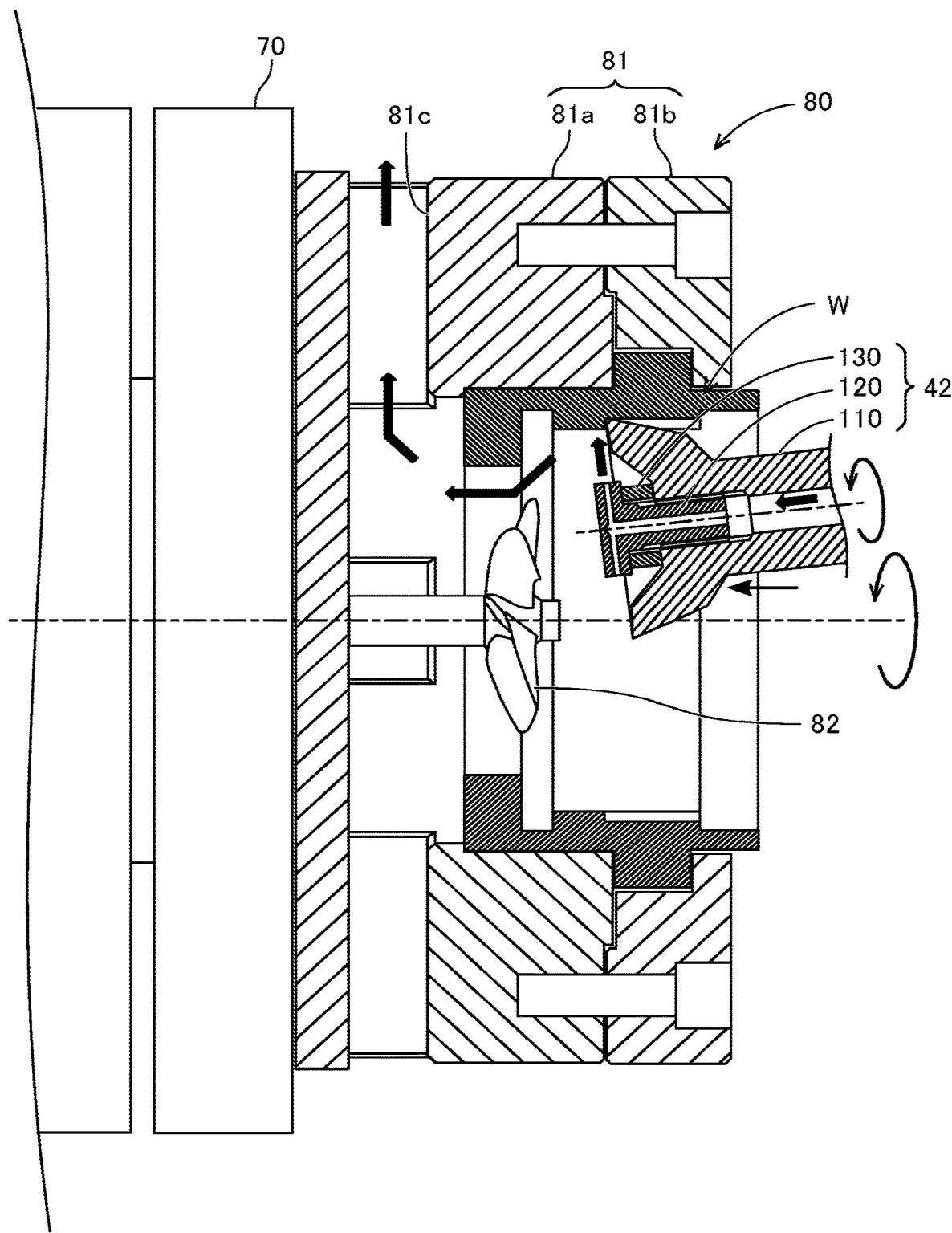
FIG. 3 is a cross-sectional view of a workpiece holder taken along the axial direction and a gear machining method by the first gear cutting tool.

As illustrated in FIG. 3, the gear W is held on the inner peripheral side of the main body 81 of the workpiece holder 80. In other words, the center axis of the gear W is coaxial with the center of rotation of the turn table 70. The first gear cutting tool 42 is fixed to the rotary main spindle 40. At this time, an axial line parallel to the center axis of the first gear cutting tool 42 has an intersection angle with respect to the center axis of the gear W.

In this state, the gear W and the first gear cutting tool 42 rotate synchronously. The coolant liquid supply device 90 then supplies the coolant liquid to the rotary main spindle 40. In other words, the coolant liquid is supplied to the first gear cutting tool 42 via the center hole of the rotary main spindle 40.

Specifically, in the first gear cutting tool 42, the coolant liquid flows into the center hole 113 of the tool body 110. Then, the coolant liquid flows from the center hole 113 of the tool body 110 into the first flow channel 123a of the nozzle 120. Subsequently, the coolant liquid flows from the first flow channel 123a of the nozzle 120 into the second flow channel 123b, and is discharged from the opening of the second flow channel 123b. In other words, the coolant liquid is discharged from the outer peripheral surface of the head portion 122 of the nozzle 120 to radially outside. The discharged coolant liquid proceeds toward the plurality of blades 112a.

In this state, the first gear cutting tool 42 moves relatively to the gear W in the axial direction of the gear W. Therefore, the plurality of blades 112a of the first gear cutting tool 42 start machining of the gear W. In other words, the coolant liquid proceeds toward a cutting portion to be cut by the plurality of blades 112a from the outer peripheral surface of the head portion 122 of the nozzle 120 while the plurality of blades 112a machine the gear W.

Here, the workpiece holder 80 rotates in association with the rotation of the turn table 70. In other words, the fan 82 of the workpiece holder 80 rotates. Therefore, in an internal space of the main body 81 of the workpiece holder 80, a flow of fluid toward the drain ports 81c is being generated. Therefore, the coolant liquid reaches the cutting portion, then flows from the cutting portion toward the drain ports 81c, and is drained from the drain ports 81c to the outside. Chips generated during cutting operation move from the cutting portion to the drain ports 81c and are drained from the drain ports 81c together with the flow of the coolant liquid to the outside.

1-5. Shape of First Gear Cutting Tool 42 after Regrinding

Figure 4:
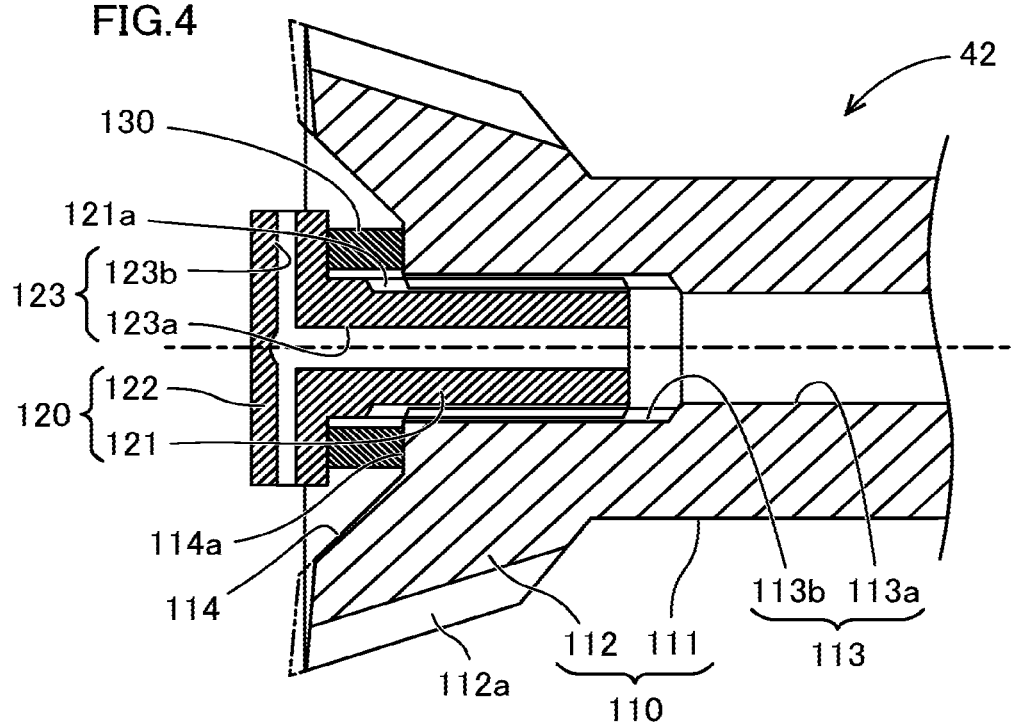
FIG. 4 is a cross-sectional view of the first gear cutting tool after regrinding taken along the axial direction.

Subsequently, a case where the blades 112a of the first gear cutting tool 42 are reground will be described with reference to FIG. 4. The shapes of the blades 112a before regrinding are illustrated by alternate long and two short dashed lines in FIG. 4.

The blades 112a of the first gear cutting tool 42 are reground when worn. When the blades 112a are reground, an axial length of the large-diameter end portion 112 of the tool body 110 is reduced as illustrated in FIG. 4. At this time, the spacer 130 is also shortened so as to match the axial length of the large-diameter end portion 112. Therefore, the relative position between the head portion 122 of the nozzle 120 and the rake face of the blades 112a does not change before and after regrinding. Therefore, even after regrinding of the blades 112a, a coolant liquid may be supplied to the cutting portion of the blades 112a.

1-6. Advantageous Effects of First Embodiment

The first gear cutting tool 42 includes the tool body 110 having the plurality of blades 112a on the outer peripheral surface thereof and the center hole 113, and the nozzle 120 provided in the center hole 113 of the tool body 110 so that the fixed position in the tool body 110 is adjustable. The nozzle 120 includes the flow channel 123 which allows the supplied coolant liquid to flow into the center hole 113 of the tool body 110, and discharge the coolant liquid toward the plurality of blades 112a.

As described above, the nozzle 120 in the first gear cutting tool 42 is adjustable with respect to the tool body 110. Therefore, when the plurality of blades 112a of the tool body 110 are reground, the position of the nozzle 120 may be adjusted even when the positions of the cutting edges change. In other words, the position at which the nozzle 120 discharge the coolant liquid may be adjusted. Therefore, even when the blades 112a are reground, the coolant liquid discharged from the nozzle 120 may be supplied to the optimal positions of the blades 112a.

The tool body 110 is provided with the mounting seat 114a formed in the periphery of the opening of the center hole 113 of the tool body 110. The nozzle 120 includes the shaft portion 121 and the head portion 122. The shaft portion 121 is fastened in a state of being inserted into the center hole 113 of the tool body 110, and includes the first flow channel 123a extending in the axial direction as part of the flow channel 123. The head portion 122 is provided at an end of the shaft portion 121, is provided outside the opening of the center hole 113 of the tool body 110, and includes the second flow channel 123b discharging the coolant liquid flowed into the first flow channel 123a radially outward as another part of the flow channel 123.

The first gear cutting tool 42 also includes spacers 130, 230 interposed between the mounting seat 114a and the head portion 122 in the axial direction. The provision of the spacers 130, 230 makes the fixed position of the nozzle 120 in the tool body 110 adjustable in the center hole 113 of the tool body 110. In other words, by using the spacers 130, 230, the fixed position of the nozzle 120 becomes easily adjustable.

The spacer 130 is interposed between the mounting seat 114a and the head portion 122 in the axial direction in a state of being in contact with the mounting seat 114a and the head portion 122 of the nozzle 120. In other words, by adjusting an axial length of the spacer 130, the fixed position of the nozzle 120 may be adjusted. Here, a plurality of the spacers 130 having different axial lengths may be prepared in advance, or the axial length of the spacer 130 may be cut to be shortened at every regrinding.

In particular, the center hole 113 of the tool body 110 has the female screw 113b, and the shaft portion 121 of the nozzle 120 has the male screw 121a to be screwed into the female screw 113b in the center hole 113 of the tool body 110. Therefore, the nozzle 120 may be attached easily into the center hole 113 of the tool body 110. In addition, the spacer 130 is an annular collar member that does not engage the male screw 121a of the shaft portion 121 of the nozzle 120. Since the spacer 130 has an annular shape, the spacer 130 may be attached on the shaft portion 121 of the nozzle 120 easily. Furthermore, the fixed position of the nozzle 120 may be determined easily only by adjusting the axial length of the spacer 130.

The gear machining device 1 includes the first gear cutting tool 42, the workpiece holder 80 configured to hold the gear W to be machined and being capable of rotating about the center axis of the gear W, and the rotary main spindle 40 holding the first gear cutting tool 42, being provided so as to be rotatable about the center axis of the first gear cutting tool 42 and being movable relatively to the gear W in a direction of the center axis of the gear W. The gear W to be machined is an internal gear.

Here, the workpiece holder 80 includes the main body 81 formed into a cylindrical shape, having the drain ports 81c communicating cylindrical inner peripheral surface and outer peripheral surface with each other to drain the coolant liquid at inner positions thereof with respect to the position at which the gear W is held in the direction of travel of the first gear cutting tool 42, and the fan 82 disposed radially inside the main body 81 of the workpiece holder 80, disposed between the cutting portion of the gear W and the drain ports 81*c* in the axial direction, and configured to guide the coolant liquid discharged from the nozzle 120 to the drain ports 81*c* by generating a flow of fluid from the cutting portion of the gear W toward the drain ports 81*c*.

Accordingly, with the provision of the fan 82, the chips generated at the cutting portion are also guided to the drain ports 81*c* with the flow of the coolant liquid from the cutting portion to the drain ports 81*c*. Therefore, the chips are prevented from accumulating in the vicinity of the cutting portion, so that machining of the gear W with high degree of accuracy is achieved.

In particular, the gear machining device 1 employs a gear machining method which machines the gear W by the first gear cutting tool 42 by moving the first gear cutting tool 42 relatively to the gear W in the direction of the center axis of the gear W while rotating the first gear cutting tool 42 and the gear W to be machined respectively. According to the gear machining method, if the chips are accumulated on the distal side of the first gear cutting tool 42 in the direction of travel, the accuracy of shape of the gear W is affected. Therefore, by using the above-described first gear cutting tool 42, the chips may be eliminated effectively, and consequently, machining of the gear W with high degree of accuracy is achieved.

2. Second Embodiment

Subsequently, a second gear cutting tool 242 according to a second embodiment will be described with reference to FIG. 5. In the second gear cutting tool 242 of the second embodiment, the spacer 230 is substantially different from that in the first gear cutting tool 42 of the first embodiment.

Figure 5:
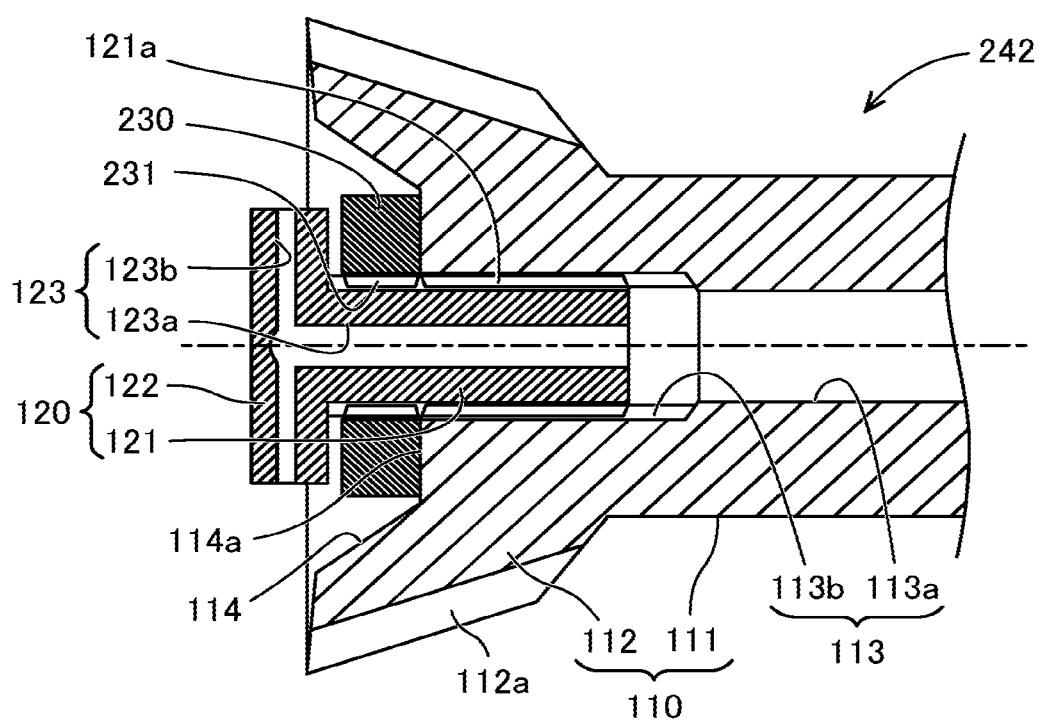
FIG. 5 is a cross-sectional view of a second gear cutting tool of a second embodiment taken along the axial direction.

As illustrated in FIG. 5, the spacer 230 is formed into an annular shape, and is a nut provided with a female screw 231 on an inner peripheral surface thereof. The female screw 231 of the spacer 230 is screwed into the male screw 121*a* on the shaft portion 121 of the nozzle 120. One of the end surfaces of the spacer 230 is in contact with the mounting seat 114*a*. The spacer 230 has a double nut structure in corporation with the tool body 110.

A method of attaching the nozzle 120 to the tool body 110 will be described. The spacer 230 is screwed onto the shaft portion 121 of the nozzle 120. Subsequently, the shaft portion 121 of the nozzle 120 is screwed into the female screw 113*b* of the tool body 110. Then, the fixed position of the nozzle 120 in the tool body 110 is determined. Subsequently, the spacer 230 is rotated and pushed against the mounting seat 114*a*, and the nozzle 120 is fixed to the tool body 110.

After the blades 112*a* are reground, the same method as described above may be performed for fixing the nozzle 120 again. Therefore, the relative position between the head portion 122 of the nozzle 120 and the rake face of the blades 112*a* is prevented from being changed before and after regrinding. In other words, even after regrinding of the blades 112*a*, a coolant liquid may be supplied to the cutting portion of the blades 112*a*.

The second gear cutting tool 242 has the same advantageous effects as the first gear cutting tool 42 described above. Here, the center hole 113 of the tool body 110 has the female screw 113*b*, and the shaft portion 121 of the nozzle 120 has the male screw 121*a* to be screwed into the female screw 113*b* in the center hole 113 of the tool body 110. Furthermore, the spacer 230 is a nut screwed into the male screw 121*a* on the shaft portion 121 of the nozzle 120. In other words, the spacer 230 which is a nut functions as a double nut structure in cooperation with the female screw 113*b* of the tool body 110. Accordingly, the fixed position of the nozzle 120 may be adjusted easily.

3. Third Embodiment 3-1. Detailed Configuration of Third Gear Cutting Tool 320

Figure 6:
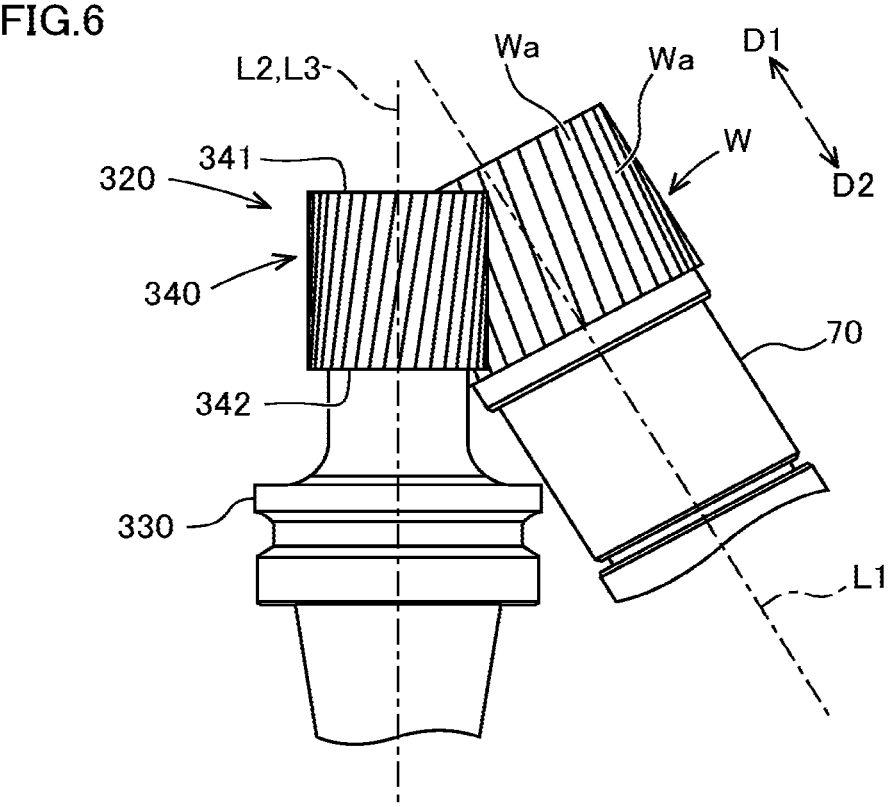
FIG. 6 is a drawing illustrating a machining action for machining a gear using a third gear cutting tool of a third embodiment.

A configuration of a third gear cutting tool 320 will be described with reference to FIG. 6 to FIG. 8. As illustrated in FIG. 6, the third gear cutting tool 320 includes a shaft member 330, a blade portion 340, and a bolt 350 (illustrated in FIG. 8). Here, a machining action for machining the gear W using the third gear cutting tool 320 is an action of moving the third gear cutting tool 320 relatively to the gear W in a direction of a center axis L1 of the gear W while rotating the third gear cutting tool 320 about a center axis L2.

The shaft member 330 rotates about the center axis L2 of the third gear cutting tool 320 in the machining action. In the third embodiment, the shaft member 330 is a holder member to be held by the rotary main spindle 40. The shaft member 330 includes a mounting portion 331 and a large-diameter portion 332 as illustrated in FIG. 8. The mounting portion 331 includes a cylindrical outer surface 331*a* set to a predetermined outer diameter, on which the blade portion 340 is attached on an outer peripheral side. The large-diameter portion 332 is formed to be larger in diameter than the outer diameter of the mounting portion 331.

The blade portion 340 is provided coaxially with the shaft member 330, that is, so that a center axis L3 of the blade portion 340 coincides with the center axis L2 of the shaft member 330. The blade portion 340 includes a plurality of first cutting blades 341, a plurality of second cutting blades 342, and a fixed portion 343. The plurality of first cutting blades 341 are formed equidistantly on the outer periphery of the blade portion 340 in the circumferential direction. Each of the plurality of first cutting blades 341 is formed by an intersection of a rake face 341*a*, a front flank 341*b*, and a side flank 341*c* as illustrated in FIG. 7.

The rake faces 341*a* of the first cutting blades 341 have a rake angle γ. The rake faces of the first cutting blades 341 may be tapered about the center axis L2 of the third gear cutting tool 320, or may be formed into surfaces facing different directions for each of the first cutting blades 341. A circumscribed circle of the plurality of first cutting blades 341 of the third gear cutting tool 320 is formed into a cylindrical shape. In other words, the front flanks 341*b* of the first cutting blades 341 are formed so that distances to the center axis L3 of the blade portion 340 become constant. The side flanks 341*c* of the first cutting blades 341 are blade side surfaces having a predetermined side relief angle with respect to the rake faces 341*a* of the first cutting blades 341.

In addition, each of the plurality of first cutting blades 341 has a torsion angle with respect to the center axis L3 of the blade portion 340. However, the torsion angle of the first cutting blades 341 is set as needed depending on the torsion angle of teeth Wa of the gear W and an intersection angle between the gear W and the third gear cutting tool 320 in cutting work for manufacturing the gear. Therefore, the first cutting blades 341 may not have the torsion angle.

In the third embodiment, the first cutting blades 341 and the second cutting blades 342 are of the same type. In other words, each of the second cutting blades 342 is formed by an intersection of a rake face 342a having the same rake angle γ as the first cutting blade 341 formed at one end of the blade portion 340, a front flank 342b, and a side flank 342c, and is set to have the same specifications as the first cutting blade 341. However, the rake faces 341a of the first cutting blades 341 face one side in the direction of the center axis L3 of the blade portion 340, while the rake faces 342a of the second cutting blades 342 face the other side in the direction of the center axis L3 of the blade portion 340.

Figure 7:
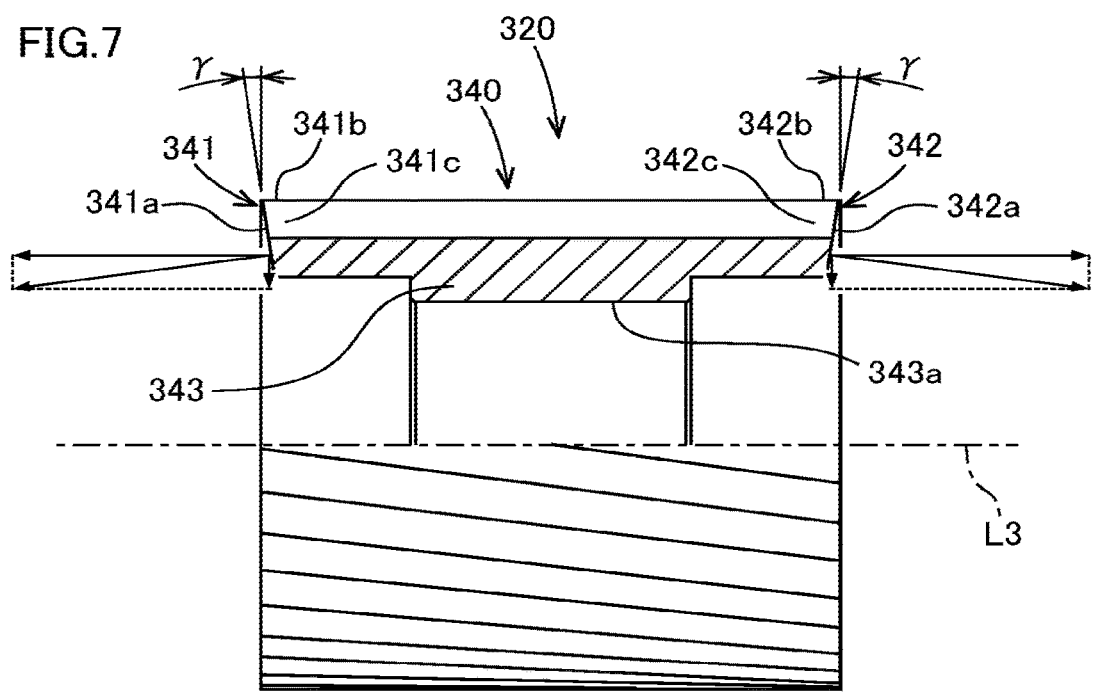
FIG. 7 is an enlarged view illustrating a configuration of a blade portion of the third gear cutting tool.
Figure 8:
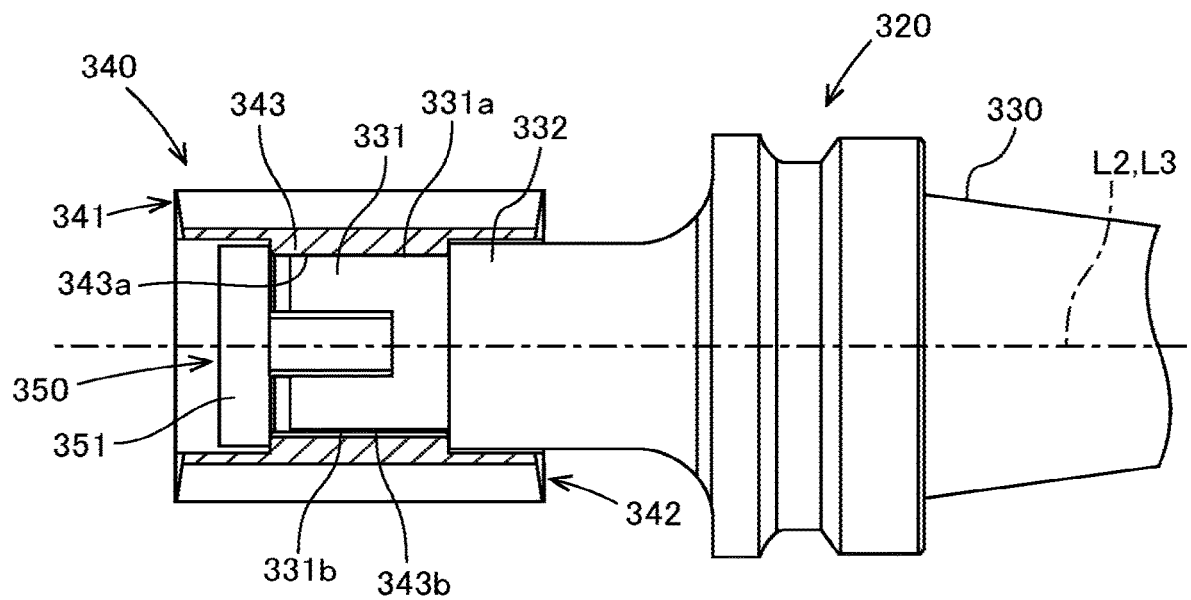
FIG. 8 is a cross view of the gear cutting tool in a state in which the blade portion is mounted on a shaft member.

Here, the expression "the rake faces 341a face one side in the direction of the center axis L3 of the blade portion 340" indicates a state in which even when the rake faces 341a have a predetermined rake angle γ as illustrated in FIG. 7, directional components of normal lines of the rake faces 341a, which extend parallel to the center axis L3 of the blade portion 340, face one side in the direction of the center axis L3. Therefore, although the second cutting blades 342 are of the same type as the first cutting blades 341, the directional components of the normal lines of the rake faces 342a, which extend parallel to the center axis L3 of the blade portion 340, face the other side of the center axis L3, and the directions that the rake faces 342a face are different from those of the first cutting blades 341.

In the third embodiment, the first cutting blade 341 and the second cutting blade 342 are formed at both end portions of the same projecting ridge formed on the peripheral surface of the blade portion 340 with a torsion angle. In other words, a pair of the first cutting blades 341 and the second cutting blades 342 have the front flanks 341b, 342b and side flanks 341c, 342c formed on the same surface, respectively. In this configuration, in the blade portion 340, when the first cutting blades 341 and the second cutting blades 342 are formed on the peripheral surface, part of the process steps of forming the front flanks 341b, 342b and the side flanks 341c, 342c may be shared in common.

As described above, the front flanks 341b of the first cutting blades 341 and the front flanks 342b of the second cutting blades 342 are formed so that the distances to the center axis L3 of the blade portion 340 become constant. Therefore, an outer shape of the blade portion 340 may be formed into a cylindrical shape as a whole. However, forming an end portion of the blade portion 340 to have a truncated conical shape by setting front relief angles to the respective front flanks 341b, 342b is also applicable.

In the third embodiment, the blade portion 340 is a separate member from the shaft member 330, and is provided so as to be detachably attachable with respect to the shaft member 330. The blade portion 340 is formed to be reversed in the direction of the center axis L3 of the blade portion 340 with respect to the shaft member 330. More specifically, as illustrated in FIG. 8, the blade portion 340 may be attached so that the first cutting blades 341 are positioned on a distal side (left side in FIG. 8) of the shaft member 330 and the second cutting blades 342 are positioned on a proximal side (right side in FIG. 8) of the shaft member 330. The blade portion 340 may also be attached in such a manner that the first cutting blades 341 are positioned on the proximal side of the shaft member 330 and the second cutting blades 342 are positioned on the distal side of the shaft member 330.

Here, the blade portion 340, having the configuration as described above, is formed into a symmetrical shape with respect to the center axis L3. Therefore, the third gear cutting tool 320 is configured to have the same function when the blade portion 340 is attached to the shaft member 330 so that the first cutting blades 341 come to the distal side as the case where the blade portion 340 is attached to the shaft member 330 so that the second cutting blades 342 come to the distal side.

The fixed portion 343 is formed at a center in the inner periphery of the blade portion 340 in the direction of the center axis L3 of the blade portion 340, and is a portion to be fixed to the shaft member 330. The fixed portion 343 includes a cylindrical inner surface 343a formed to have an inner diameter smaller than both end portions thereof. The inner diameter of the cylindrical inner surface 343a is set to be slightly larger than the cylindrical outer surface 331a of the mounting portion 331 of the shaft member 330. In this configuration, the blade portion 340 is attached so that the cylindrical inner surface 343a of the fixed portion 343 is fitted on the cylindrical outer surface 331a of the mounting portion 331. Accordingly, the centering is achieved so that the center axis L3 of the blade portion 340 coincides with the center axis L2 of the shaft member 330.

In addition, a length of the fixed portion 343 in the direction of the center axis L3 is set to be longer than the length of the mounting portion 331 of the shaft member 330 in the direction of the center axis L2. Accordingly, when the blade portion 340 is moved to a position where one end of the fixed portion 343 comes into contact with the large-diameter portion 332 of the shaft member 330, a portion from an end of the mounting portion 331 to the other end of the fixed portion 343 is positioned on a distal side (left side in FIG. 8) of the third gear cutting tool 320. The bolt 350 is fastened to the end portion of the shaft member 330 in the direction of the center axis L2. The head portion 351 of the bolt 350 is formed to be larger in diameter than the inner diameter of the cylindrical inner surface 343a of the fixed portion 343 and to be smaller than the inner diameter of the inner peripheral surface of the blade portion 340 other than the fixed portion 343.

The fixed portion 343 of the blade portion 340 is interposed between the large-diameter portion 332 of the shaft member 330 and the head portion 351 of the bolt 350 in the direction of the center axis L2 of the shaft member 330 when the bolt 350 is fastened to the shaft member 330. By removing the bolt 350, the blade portion 340 is allowed to be detached from the mounting portion 331 of the shaft member 330. In addition, the blade portion 340 is locked with respect to the shaft member 330 in the circumferential direction, and is prevented from rotating with respect to the shaft member 330. Specifically, a projecting portion 343b formed on the fixed portion 343 of the blade portion 340 is inserted into a key groove 331b formed in the mounting portion 331 of the shaft member 330, whereby relative rotation of both members is restricted. Depending on the torque generated between the shaft member 330 and the blade portion 340 due to cutting resistance during gear machining, a mechanism for preventing rotation as described above may be omitted.

3-2. Gear Machining Method

Subsequently, a method of machining the gear W to be machined by the gear machining device 1 will be described with reference to FIG. 6 and FIG. 9. Here, the gear machining method employs skiving. The skiving is a method which machines the gear W with the third gear cutting tool 320 by moving the third gear cutting tool 320 relatively to the gear W in the direction of the center axis L1 of the gear W while rotating the third gear cutting tool 320 and the gear W to be machined respectively. Although an external gear is exemplified as the gear W, an internal gear may be applied as the gear W.

Note that in the directions of the center axis L1 of the gear W, a direction from the end of the gear W on the turn table 70 side toward the opposite end is defined as a first direction D1 (a direction from lower right to upper left in FIG. 6) in the following description. In the directions of the center axis L1 of the gear W, a direction opposite to the first direction D1 is defined as a second direction D2 (a direction from upper left to lower right in FIG. 6). It is assumed that the blade portion 340 is attached to the shaft member 330 so that the first cutting blades 341 are positioned on the distal side of the third gear cutting tool 320 during the gear machining.

Figure 9:
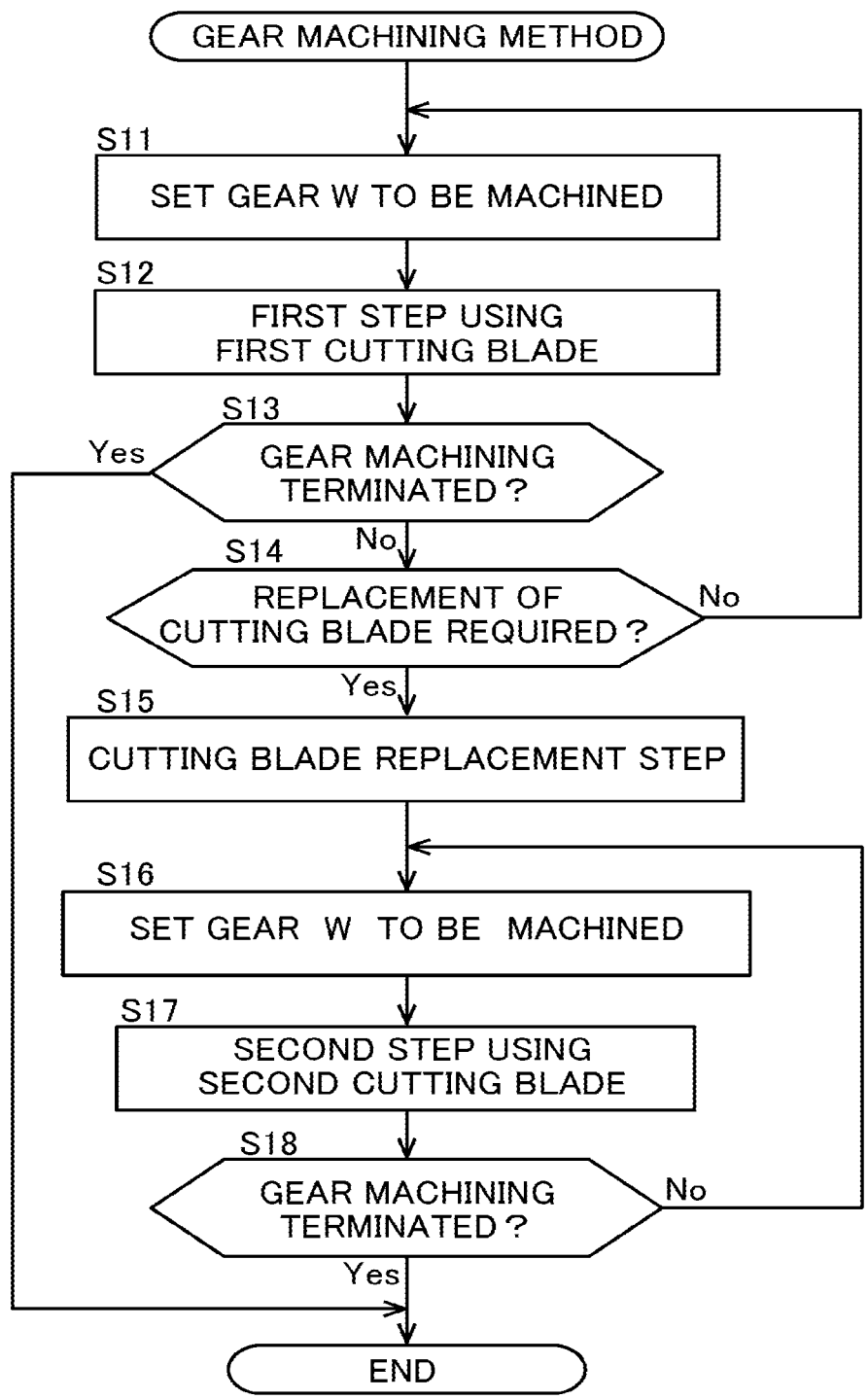
FIG. 9 is a flowchart of a gear machining method using the third gear cutting tool.

First of all, as illustrated in FIG. 9, the gear W to be machined (workpiece) is set automatically or manually in the holder 80 (S11). Subsequently, a first step is performed (S12). Specifically, the first step (S12) is a step of machining the gear W by the first cutting blades 341 by moving the third gear cutting tool 320 relatively to the gear W in the first direction D1 or the second direction D2 along the direction of the center axis L1 of the gear W. Here, a pushing work in which the third gear cutting tool 320 is moved relatively to the gear W in the first direction D1, and the distal side of the third gear cutting tool 320 is pushed against the gear W is performed.

In the first step (S12), the number of times of relative movement of the third gear cutting tool 320 with respect to the gear W is set as needed as the number of times of cutting the gear W in the radial direction. For example, when the cutting is performed by a plurality of times, positioning to an initial position and a machining action in which the relative movement is performed once are repeated. As used herein the term "initial position" described above is intended to include a position where the gear W and the third gear cutting tool 320 are not in contact, and is a position where the center axis L1 of the gear W and the center axis L2 of the third gear cutting tool 320 have a predetermined intersection angle.

In the machining action described above, the gear W is rotated about the center axis L1, and in synchronous with the rotation of the gear W, the third gear cutting tool 320 is rotated about the center axis L2. At the same time, the third gear cutting tool 320 is moved relatively to the gear W in the first direction D1 along the direction of the center axis L1 of the gear W. When the positioning and the machining action are performed by the number of times corresponding to the number of cutting preset in the first step (S12), the teeth Wa having a final desired shape are formed.

Subsequently, whether the gear machining is to be terminated or not is determined depending on whether or not the gear W is produced by a scheduled quantity by the gear machining (S13). In the case where a current production quantity does not reach the scheduled quantity (S13: No), whether replacement of the cutting blade is necessary or not is determined (S14). Whether or not the replacement of the cutting blade is necessary is determined based on a wearing condition of the currently using first cutting blades 341. Specifically, when the wearing condition calculated based on the number of times of the machining action, an amount of cutting, and a machining speed using the first cutting blades 341 is lower than a certain level, the replacement of the cutting blade is determined to be unnecessary (S14: No).

When the replacement of the cutting blade is unnecessary (S14: No), the above-described steps S11 to S13 are repeatedly performed. In contrast, when the wearing condition of the first cutting blades 341 reaches the certain level or higher, the replacement of the cutting blade is determined to be necessary (S14: Yes). Then, the step of replacement of the cutting blade is performed automatically or manually (S15). The step of replacement of the cutting blade (S15) is specifically a step of detaching the bolt 350 of the third gear cutting tool 320, replacing the direction of the center axis L3 of the blade portion 340 with respect to the shaft member 330, and fastening the bolt 350 again.

When the step of replacement of the cutting blade (S15) is performed, the second cutting blades 342 are positioned on the distal side of the third gear cutting tool 320. Then, setting of the gear W (workpiece) (S16), a second step (S17), and determination of termination of the gear machining (S18) are performed. The respective steps S16 to S18 relating to the second step are substantially the same as S11 to S13 relating to the first step, detailed description will be omitted. The direction of movement of the third gear cutting tool 320 relative to the gear W in the second step (S17) is the first direction D1 in the same manner as the first step (S12).

The wearing condition of the second cutting blades 342 is controlled separately from the first cutting blades 341. When the wearing conditions of both of the first cutting blades 341 and the second cutting blades 342, for example, reach the certain level or higher, the blade portion 340 itself is required to be replaced. The replacement of the blade portion 340 may be performed automatically, or manually by notifying an operator or the like that replacement is required. When the current production quantity reaches the scheduled quantity (S13: Yes, S18: Yes), the gear machining is terminated.

3-3. The First Modification of Third Embodiment

In the third embodiment, in the first step (S12) and the second step (S17), the third gear cutting tool 320 is moved relatively to the gear W in the first direction D1. In contrast, the directions of movement of the third gear cutting tool 320 relative to the gear W in the first step (S12) and the second step (S17) may be opposite to each other.

In other words, for example, the first cutting blades 341 are used when moving the third gear cutting tool 320 relatively to the gear W to one side in the direction of the center axis L1 of the gear W (first direction D1) in the machining action in the first step (S12). Also, the second cutting blades 342 may configured to be used when moving the third gear cutting tool 320 relatively to the gear W to the opposite side (second direction D2) of the direction of the center axis L1 of the gear W in the machining action in the second step (S17).

In the configuration described above, according to a mode illustrated in the third embodiment, in the first step (S12) using the first cutting blades 341, the gear W is formed by pushing work of the third gear cutting tool 320. In the second step (S17) using the second cutting blades 342, the gear W is formed by pulling work in which the distal side of the third gear cutting tool 320 is pulled back with respect to the gear W. Therefore, in the configuration described above, the gear machining in which the step of replacement of the cutting blade (S15) is omitted is enabled.

Figure 10:
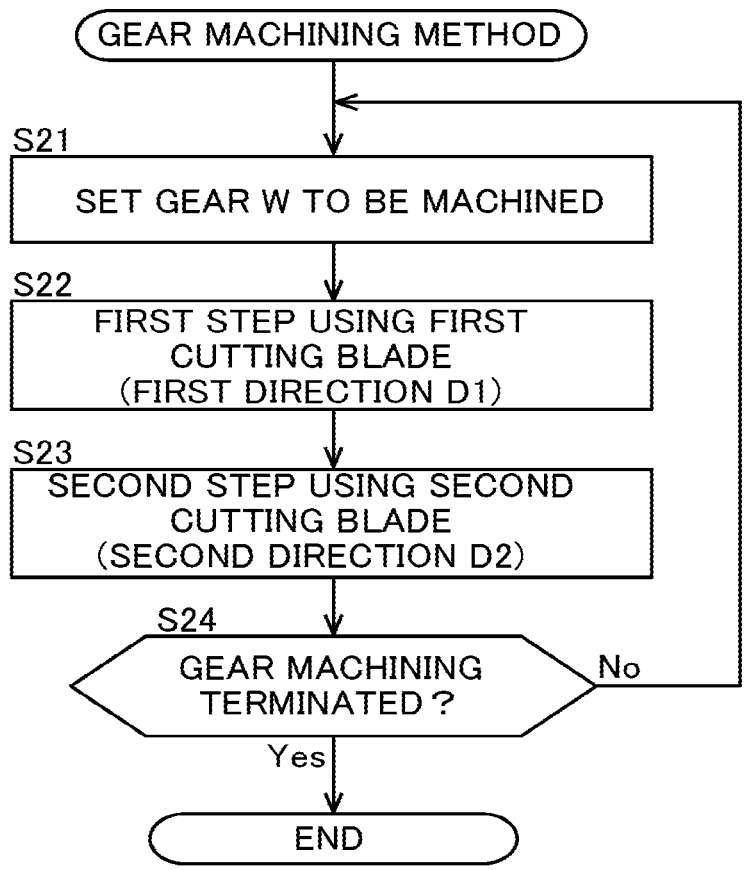
FIG. 10 is a flowchart of a gear machining method using the third gear cutting tool of a first modification.

In the case where the pushing work and the pulling work are performed in the gear machining as described above, the respective works may be performed for machining different axial positions of the same gear W. For example, this may be applied to machining of double helical gear having teeth of different specifications integrally on the same axis. According to the method of machining the gear W to be machined, as illustrated in FIG. 10, setting of the gear W (workpiece)

(S21), a first step (S22), a second step (S23), and determination of termination of gear machining (S24) are performed.

At this time, initial positions and the directions of movements of the third gear cutting tool 320 relative to the gear W in the first step (S22) and the second step (S23) are different from each other. In other words, the first step (S22) using the first cutting blades 341 and the second step (S23) using the second cutting blades 342 are performed as a set with respect to the same gear W, and the gear machining is performed until the scheduled quantity is achieved (S24). In this configuration, the number of times of setting of the gear W and the number of times of replacement of the cutting blade may be reduced in comparison with the normal gear machining, so that machining time required for gear machining may be shortened.

3-4. Second Modification of Third Embodiment

Figure 11:
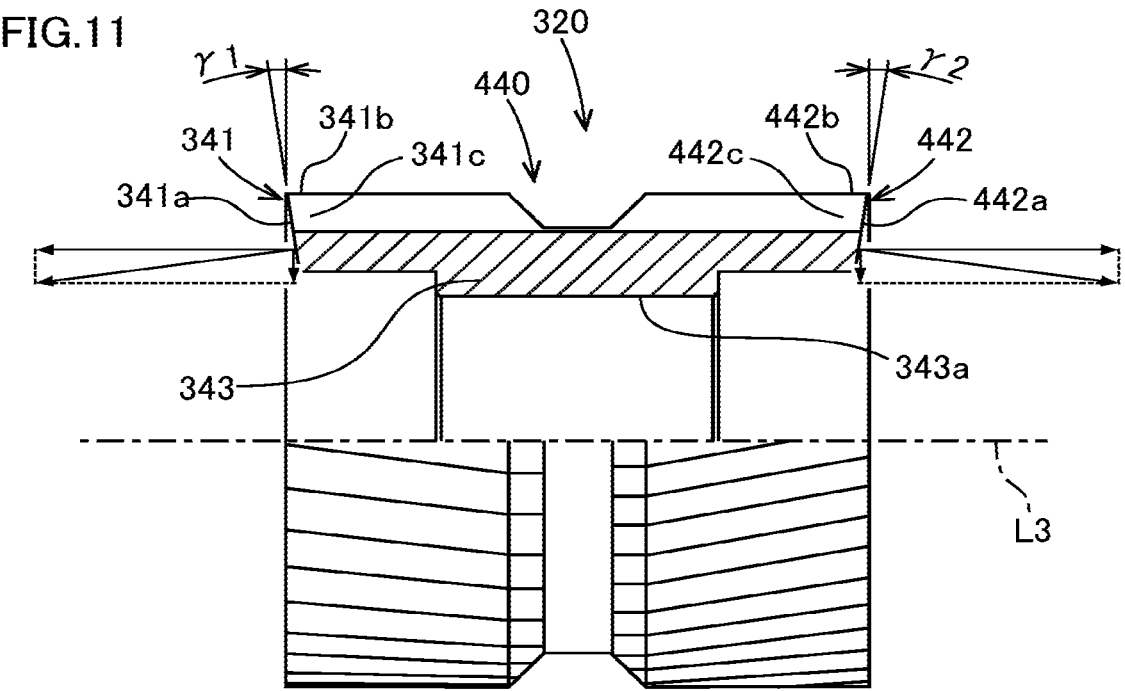
FIG. 11 is an enlarged view of a second modification of the third gear cutting tool illustrating a configuration of the blade portion of the gear cutting tool.

In the third gear cutting tool 320 of the third embodiment, the first cutting blades 341 and the second cutting blades 342 of the blade portion 340 are of the same type. In contrast, the first cutting blades 341 and the second cutting blades 342 may be of types different from each other. For example, as illustrated in FIG. 11, each of second cutting blades 442 of a blade portion 440 is formed by an intersection of a rake face 442$a$ having a second rake angle γ2 different from a first rake angle γ1 of the first cutting blades 341, a front flank 442$b$, and a side flank 442$c$, and is set to different specifications from the first cutting blades 341.

In the configuration described above, a plurality of types of the gear W may be formed by the single blade portion 440. In the gear machining using the third gear cutting tool 320 provided with the blade portion 440 having cutting blades of types different from each other, when the machining action is performed only by the pushing work (or the pulling work) as illustrated in the third embodiment, whether or not the gear machining is to be terminated is determined based on the respective production quantities of the two types of gears (see S13, S18 in FIG. 9).

In addition, when the machining action including the pushing work and the pulling work is performed on the same gear W as well as exemplified in the first modification, the gear machining using the third gear cutting tool 320 provided with the blade portion 440 having cutting blades of types different from each other is also enabled. At this time, steps of setting the gear W and replacing the cutting blade may be inserted as needed between the first step (S22) and the second step (S23) so as to meet the desired production of the gears W.

3-5. Advantageous Effects of Third Embodiment and Modifications

The third gear cutting tool 320 is used for machining the gear W. The machining action for machining the gear W using the third gear cutting tool 320 is an action of moving the third gear cutting tool 320 relatively to the gear W in the direction of the center axis L1 of the gear W while rotating the third gear cutting tool 320 about the center axis L2. The third gear cutting tool 320 includes the shaft member 330 rotated about the center axis L2 of the third gear cutting tool 320 in the machining action, and the blade portions 340, 440 provided coaxially with the shaft member 330. The blade portions 340, 440 include the first cutting blades 341 having the rake faces 341$a$ facing one side in the direction of the center axis L3 of the blade portions 340, 440 and the second cutting blades 342, 442 having the rake faces 342$a$, 442$a$ facing the other side in the direction of the center axis L3 of the blade portions 340, 440.

In this configuration, the third gear cutting tool 320 includes the first cutting blades 341 and the second cutting blades 342, 442 on the blade portions 340, 440. Therefore, even when one of the first cutting blades 341 and the second cutting blades 342, 442 reach the end of the service life, gear machining using the other one of the first cutting blades 341 and the second cutting blades 342, 442 is enabled. Therefore, the elongation of the service life of the third gear cutting tool 320 is achieved.

The first cutting blades 341 are used when moving the third gear cutting tool 320 relative to the gear W to one side in the direction of the center axis L1 of the gear W in the machining action. The second cutting blades 342, 442 are used when moving the third gear cutting tool 320 relative to the gear W to other side in the direction of the center axis L1 of the gear W in the machining action.

In this configuration, the third gear cutting tool 320 may be used for the pushing work in which the distal side of the third gear cutting tool 320 is pushed forward with respect to the gear W and the pulling work in which the distal side of the third gear cutting tool 320 is pulled back with respect to the gear W. As replacement of the third gear cutting tool 320 is not required when switching the pushing work and the pulling work, improvement of productivity and reduction of manufacturing cost of the gear W are achieved.

The outer shapes of the blade portions 340, 440 are formed into a cylindrical shape.

In this configuration, the blade portions 340, 440 in the cylindrical shape allow the cutting blades to be reground easily in comparison with, for example, the blade portion having a truncated conical shape, and thus tool life may be elongated. Therefore, reduction of cost required for the gear machining is achieved.

The first cutting blades 341 and the second cutting blades 342 are of the same type.

In this configuration, the third gear cutting tool 320 includes the first cutting blades 341 and the second cutting blades 342, 442, which are of the same type. Accordingly, compared with general gear cutting tools having only cutting blades with a rake face facing one direction in the direction of the center axis L3 of the blade portion, substantially double the tool life is achieved. In the case where the blade portion 340 has a cylindrical shape, the first cutting blades 341 and the second cutting blades 342 may be produced in the same step in such a manner that the first cutting blades 341 are formed on one end side of the single projecting ridge, and the second cutting blades 342 are formed on the other end side of the projecting ridge. Therefore, production cost of the third gear cutting tool 320 may be reduced.

The first cutting blades 341 and the second cutting blades 442 are of type different from each other.

In this configuration, the third gear cutting tool 320 includes the first cutting blades 341 and the second cutting blade 442, which are of the types different from each other. Accordingly, for example, cutting blades of types corresponding to different machining steps required for the gear machining may be formed on the single third gear cutting tool 320, so that the third gear cutting tool 320 may be applied to various types of application.

The blade portions 340, 440 are formed to be detachable attached to the shaft member 330, and to be reversed in the direction of the center axis L3 of the blade portions 340, 440 with respect to the shaft member 330.

In this configuration, the third gear cutting tool 320 may be configured so that both of the first cutting blades 341 and the second cutting blades 342, 442 may be used for the pushing work and the pulling work. Therefore, the cutting blades on both ends of the blade portions 340, 440 may be used, so that the elongation of the service life of the third gear cutting tool 320 is achieved as a whole.

The shaft member 330 includes the cylindrical outer surface 331a. The blade portions 340, 440 are provided on the inner peripheries thereof with the cylindrical inner surface 343a, which may be fitted onto the cylindrical outer surface 331a of the shaft member 330.

In this configuration, the blade portions 340, 440 are centered by being fitted to the shaft member 330. Accordingly, the shaft member 330 and the blade portions 340, 440, which are separate members, may be easily disposed coaxially, so that stabilization of the rotational action is achieved.

The third gear cutting tool 320 further includes the bolt 350 fastened to the end of the shaft member 330 in the direction of the center axis L2. The fixed portion 343 to be interposed between the shaft member 330 and the head portion 351 of the bolt 350 in the direction of the center axis L2 of the shaft member 330 when the bolt 350 is fastened to the shaft member 330 is provided on inner peripheries of the blade portions 340, 440.

In this configuration of the third gear cutting tool 320, the blade portions 340, 440 are fixed to shaft member 330 by fastening the bolt. Accordingly, the blade portions 340, 440 may be reliably fixed to the shaft member 330, and fixing operation may be simplified. Therefore, working efficiencies of replacement of the blade portions 340, 440 with respect to the shaft member 330 and reversing the blade portions 340, 440 in the axial direction (the replacement step (S15) may be improved.

The blade portions 340, 440 are locked with respect to the shaft member 330 in the circumferential direction, and is prevented from rotating with respect to the shaft member 330.

In this configuration, when a load in the direction opposite to the direction of rotation is applied to the blade portions 340, 440 by contact with respect to the gear W during the gear machining, relative rotation of the blade portions 340, 440 with respect to the shaft member 330 is reliably prevented. Accordingly, an action of the third gear cutting tool 320 during the gear machining may be stabilized.

The gear machining method is a method of machining the gear W using the third gear cutting tool 320. The third gear cutting tool 320 includes the shaft member 330 rotated about the center axis L2 of the third gear cutting tool 320, and blade portions 340, 440 provided coaxially with the shaft member 330. The blade portions 340, 440 include the first cutting blades 341 having the rake faces 341a facing one side in the direction of the center axis L3 of the blade portions 340, 440 and the second cutting blades 342, 442 having the rake faces 342a, 442a facing the other side in the direction of the center axis L3 of the blade portions 340, 440.

The gear machining method includes the first step (S12, S22) of machining the gear W by the first cutting blades 341 by moving the third gear cutting tool 320 relatively to the gear W to the one side or the other side in the direction of the center axis L1 of the gear W while rotating the third gear cutting tool 320 about the center axis L2 of the third gear cutting tool 320, and the second step (S17, S23) of machining the gear W by the other one of the second cutting blades 342, 442 by moving the third gear cutting tool 320 relatively to the gear W to the one side or the other side in the direction of the center axis L1 of the gear W while rotating the third gear cutting tool 320 about the center axis L2 of the third gear cutting tool 320.

In this configuration, the first step (S12, S22) and the second step (S17, S23) which are different from each other may be performed while using the same third gear cutting tool 320 during the gear machining. At this time, since the cutting blades used in the first step (S12, S22) and the second step (S17, S23) are different from each other, the elongation of the service life of the third gear cutting tool 320 is achieved.

3-6. Others

In the third embodiment, the shaft member 330 and the blade portion 340 in the third gear cutting tool 320 are different members. In contrast, the third gear cutting tool 320 may be configured in such a manner that the blade portion 340 is formed directly on the peripheral surface of the shaft member 330. In this configuration, reverse of the first cutting blades 341 and the second cutting blades 342 exemplified in the third embodiment is not possible. However, the gear machining with the machining actions including the pushing work and the pulling work are enabled.

In addition, in the third embodiment, the bolt 350 functions as a member that couple the shaft member 330 and the third gear cutting tool 320 integrally. Here, the bolt 350 may be replaced by the nozzle 120 and the spacer 130 in the first embodiment. In the same manner, the bolt 350 may be replaced by the nozzle 120 and the spacer 230 in the second embodiment. In this configuration, in addition to the advantageous effects of the third embodiment, advantageous effects of the first embodiment and the second embodiment are achieved.

4. Fourth Embodiment 4-1. Configuration of Fourth Gear Cutting Tool 542

Figure 12:
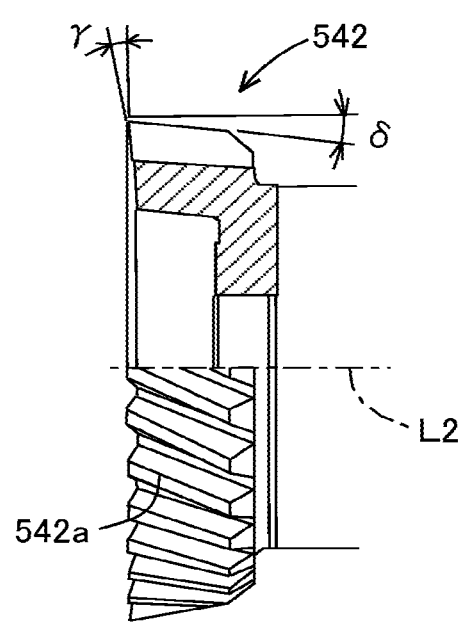
FIG. 12 is a drawing illustrating a fourth gear cutting tool of a fourth embodiment.

A configuration of a fourth gear cutting tool 542 will be described with reference to FIG. 12. As illustrated in FIG. 12, the fourth gear cutting tool 542 includes a plurality of blades 542a on an outer peripheral surface thereof. End surfaces of the respective blades 542a constitute rake faces having a rake angle γ. The rake faces of the respective blades 542a may be tapered shape about the center axis L2 of the fourth gear cutting tool 542, or may be a surface facing different directions for each of the blades 542a.

A circumscribed circle of a plurality of the blades 542a of the fourth gear cutting tool 542 is formed into a truncated conical shape. In other words, distal end surfaces of the plurality of blades 542a form front flanks having a front relief angle δ with respect to the rake faces, which are end surfaces of the blades 542a. Blade side surfaces of the plurality of blades 542a form side flanks having a side relief angle with respect to the rake faces, which are end surfaces of the blades 542a. In addition, the plurality of blades 542a have a torsion angle with respect to the center axis L2 of the fourth gear cutting tool 542. However, the torsion angles of the blades 542a are different as needed depending on the torsion angle of teeth Wa of the gear W and an intersection angle between the gear W and the fourth gear cutting tool 542 in cutting work. Therefore, the blades 542a may not have the torsion angle.

4-2. Gear Machining Method

Subsequently, a method of machining the gear W to be machined by the gear machining device 1 will be described with further reference to FIG. 14A to FIG. 16C in addition to flowcharts in FIG. 13A and FIG. 13B. Here, the gear machining method employs skiving. The skiving is a method which machines the gear W by the fourth gear cutting tool 542 by moving the fourth gear cutting tool 542 relatively to the gear W in the direction of the center axis L1 (which corresponds to the predetermined direction in the present invention) of the gear W while rotating the fourth gear cutting tool 542 and the gear W respectively.

In this embodiment, a case where tooth grooves of a first gear W(1) and a second gear W(2) are machined by the fourth gear cutting tool 542 will be exemplified. However, this embodiment may be applied to a case where three or more gears W are machined. In addition, machining of the tooth grooves of the first gear W(1) and machining of the tooth grooves of the second gear W(2) are divided into three each and machined respectively.

As illustrated in FIG. 13A and FIG. 13B, the first gear W(1) to be machined is set to the workpiece holder 80 (S31). Subsequently, a unit process is performed with the first gear W (1) by designating the blade number N (S33) as 1 (S32). The unit process in S33 is a machining step in which the fourth gear cutting tool 542 is moved once relatively to the first gear W (1) in the direction of the center axis L1 of the first gear W (1).

Figure 14A:
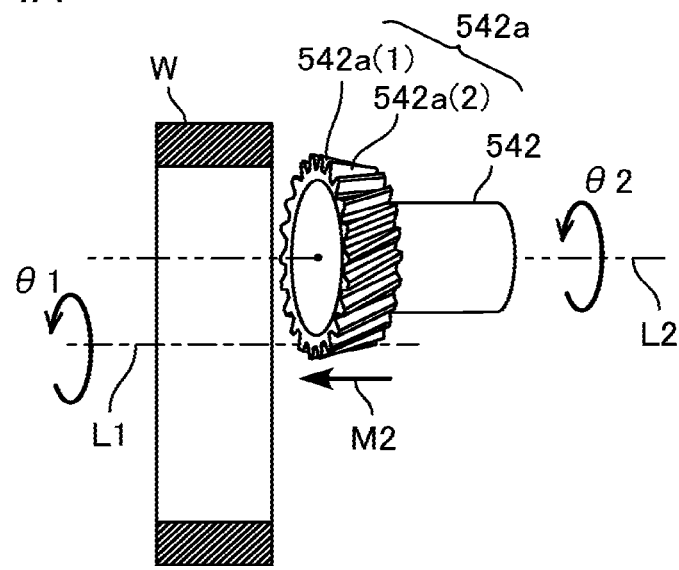
FIG. 14A is a drawing illustrating a state of positioning at an initial position in a unit process of gear machining.

Therefore, specifically, in the unit process of S33, the first gear W (1) and the fourth gear cutting tool 542 are positioned at initial positions (S33a: initial positioning step) as illustrated in FIG. 14A. As used herein the term "initial position" is intended to include a position at which the first gear W (1) and the fourth gear cutting tool 542 are not in contact with each other, and a state in which the center axis L1 of the first gear W (1) and the center axis L2 of the fourth gear cutting tool 542 have an intersection angle.

From this initial position, the first gear W (1) is rotated about the center axis L1 (θ1), and in synchronous with the rotation of the first gear W (1), the fourth gear cutting tool 542 is rotated about the center axis L2 (θ2) (S33b: machining step). Simultaneously, the fourth gear cutting tool 542 is moved once relatively to the first gear W (1) in the direction of the center axis L1 (M2) of the first gear W (1) (S33b: machining step).

Figure 15A:
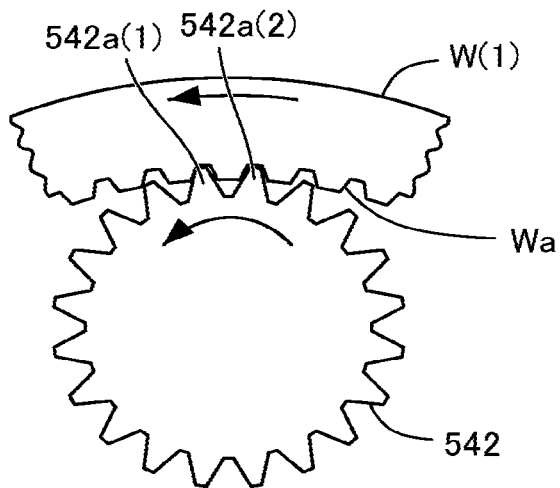
FIG. 15A is a drawing illustrating a first unit process in machining of a first gear.

Here, in the plurality of blades 542a of the fourth gear cutting tool 542, the blade to start machining in the first unit process (S33) is a first blade 542a (1) (which corresponds to a first blade in the present invention) illustrated in FIG. 15A. The blade 542a to start machining is a blade that firstly comes into contact with the first gear W (1) when moving the fourth gear cutting tool 542 relatively to the gear W in the direction of the center axis L1 (M2).

Figure 14B:
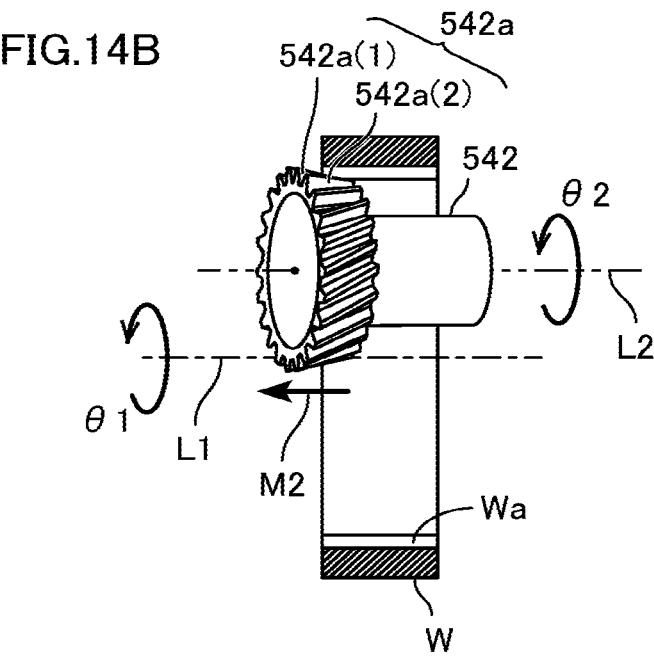
FIG. 14B is a drawing illustrating the end of the unit process of the gear machining.

Then, whether or not the unit process in S33 is terminated is determined (S34). A state in which the unit process in S33 is terminated is illustrated in FIG. 14B. In other words, the state described above is a state in which the rake faces of the blades 542a of the fourth gear cutting tool 542 have passed the first gear W (1). When the unit process in S33 is not terminated (S34: No), the machining step of S33b in the unit process in S33 is continuously performed. Here, when the first unit process is performed, teeth Wa as illustrated in FIG. 15A are formed on the first gear W (1). The groove depth of the teeth Wa at this time is on the order of ⅓ the depth of the grooves of the teeth Wa which are finally formed.

When the unit process in S33 is terminated (S34: Yes), whether or not machining of the first gear W (1) is terminated is determined (S35). Here, at the time point when the first unit process is terminated, the first gear W (1) is not completely machined. Therefore, if the machining of the first gear W (1) is not terminated (S35: No), the blade number N is incremented by 1 (S36), and the process is repeated from S33. In other words, a second unit process is performed.

In the second unit process (S33), the fourth gear cutting tool 542 is positioned at a deeper position in a cutting direction of the first gear W (1) than that positioned in the first unit process. Here, in the plurality of blades 542a of the fourth gear cutting tool 542, the blade to start machining in the second unit process (S33) is a second blade 542a (2) (which corresponds to the second blade in the present invention) illustrated in FIG. 15B. The second blade 542a (2) is different from the first blade 542a (1) for starting machining in the first unit process. In this embodiment, the second blade 542a (2) is a blade next to the first blade 542a (1).

Figure 15B:
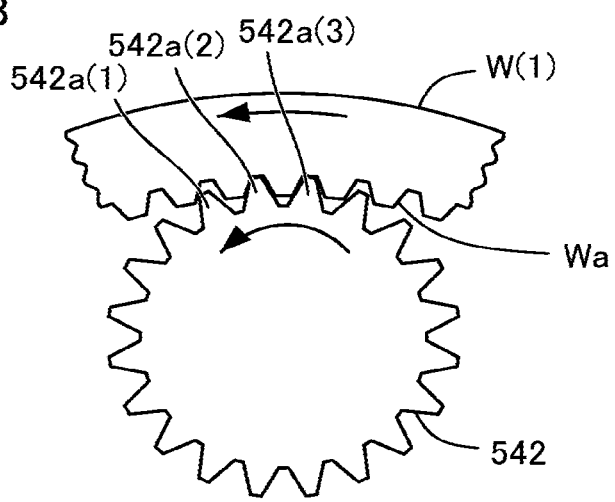
FIG. 15B is a drawing illustrating a second unit process in the machining of the first gear.

When the second unit process (S33) is performed, teeth Wa as illustrated in FIG. 15B are formed on the first gear W (1). The groove depth of the teeth Wa at this time is on the order of ⅔ the depth of the grooves of the teeth Wa which are finally formed. When the second unit process is terminated (S34: Yes), since the machining of the first gear W (1) is not terminated, the blade number N is incremented by 1 again (S36), and a third unit process is performed (S33).

In the third unit process (S33), the fourth gear cutting tool 542 is positioned at a deeper position in the cutting direction of the first gear W (1) than that positioned in the second unit process. Here, in the plurality of blades 542a of the fourth gear cutting tool 542, the blade to start machining in the third unit process (S33) is a third blade 542a (3) illustrated in FIG. 15C. Here, the third blade 542 (3) is different from the first blades 542a (1), 542a (2) for starting machining in other unit process. In this embodiment, the third blade 542a (3) is a blade next to the second blade 542a (2).

Figure 15C:
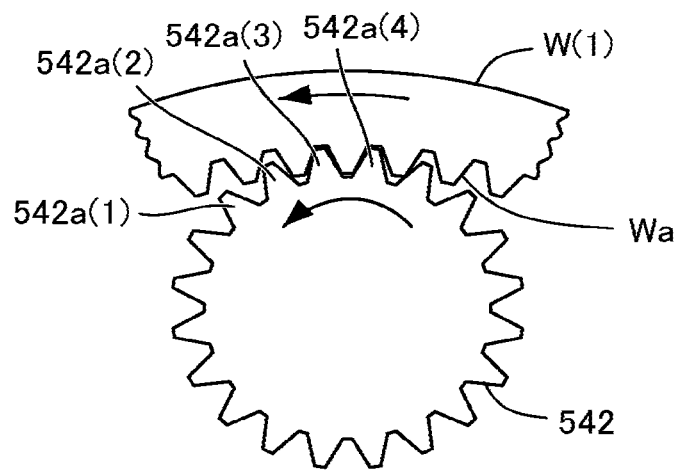
FIG. 15C is a drawing illustrating a third unit process in the machining of the first gear.

When the third unit process (S33) is performed, teeth Wa, which have a final desired shape as illustrated in FIG. 15C, are formed on the first gear W (1). In other words, the machining of the first gear W (1) is terminated (S35: Yes). When the machining of the first gear W (1) to be machined is terminated (S35: Yes), the second gear W (2) to be machined is set to the workpiece holder 80 (S41). Subsequently, the blade number N is incremented by 1 (S42), and a unit process is performed (S43). The unit process in S43 is a machining step in which the fourth gear cutting tool 542 is moved once relatively to the second gear W (2) in the direction of the center axis L1 of the second gear W (2).

Therefore, specifically, in the unit process of S43, the second gear W (2) and the fourth gear cutting tool 542 are positioned at initial positions (S43a: initial positioning step) as illustrated in FIG. 14A. As used herein the term "initial position" is intended to includes a position at which the second gear W (2) and the fourth gear cutting tool 542 are not in contact with each other, and a state in which the center axis L1 of the second gear W (2) and the center axis L2 of the fourth gear cutting tool 542 have an intersection angle.

From this initial state, the second gear W (2) is rotated about the center axis L1 (θ1), and in synchronous with a rotation of the second gear W (2), the fourth gear cutting tool 542 is rotated about the center axis L2 (θ2) (S43b: machining step). Simultaneously, the fourth gear cutting tool 542 is moved once relatively to the second gear W (2) in the direction of the center axis L1 (M2) of the second gear W (2) (S43b: machining step).

Figure 16A:
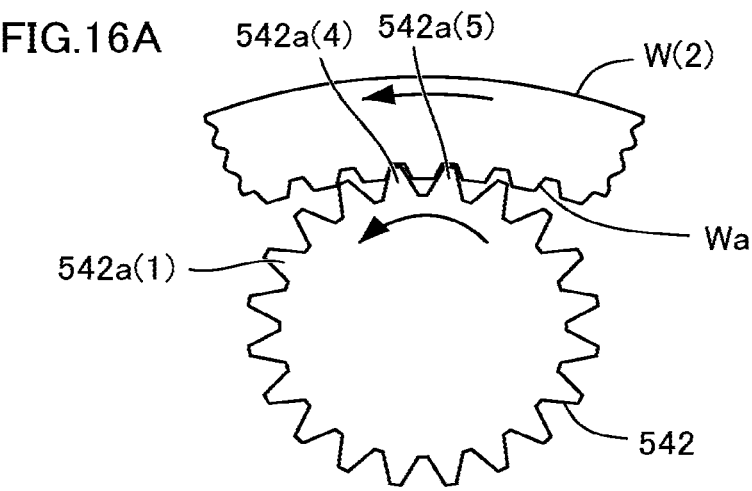
FIG. 16A is a drawing illustrating a first unit process in machining of a second gear.

Here, in the plurality of blades 542a of the fourth gear cutting tool 542, the blade to start machining in the first unit process (S43) is a fourth blade 542a (4) (which corresponds to the second blade in the present invention) illustrated in FIG. 16A. The fourth blade 542a (4) is different from the blades 542a (1) to 542a (3) for starting machining in other unit process. In this embodiment, the fourth blade 542a (4) is a blade next to the third blade 542 (3).

Then, whether or not the unit process in S43 is terminated is determined (S44). A state in which the unit process in S43 is terminated is illustrated in FIG. 14B. In other words, the state described above is a state in which the rake faces of the blades 542a of the fourth gear cutting tool 542 have passed the second gear W (2). When the unit process in S43 is not terminated (S44: No), the machining step of S43b in the unit process in S43 is continuously performed. Here, when the first unit process is performed, teeth Wa as illustrated in FIG. 16A are formed on the second gear W (2). The groove depth of the teeth Wa at this time is on the order of ⅓ the depth of the grooves of the teeth Wa which are finally formed.

When the unit process in S43 is terminated (S44: Yes), whether or not machining of the second gear W (2) is terminated is determined (S45). Here, at the time point when the first unit process is terminated, the second gear W (2) is not completely machined. Therefore, if the machining of the second gear W (2) is not terminated (S45: No), the blade number N is incremented by 1 (S46), and the process is repeated from S43. In other words, a second unit process is performed.

In the second unit process (S43), the fourth gear cutting tool 542 is positioned at a deeper position in the cutting direction of the second gear W (2) than that positioned in the first unit process. Here, in the plurality of blades 542a of the fourth gear cutting tool 542, the blade to start machining in the second unit process (S43) is a fifth blade 542a (5) illustrated in FIG. 16B. The fifth blade 542a (5) is different from the blades 542a (1) to 542a (4) for starting machining in the other unit process. In this embodiment, the fifth blade 542a (5) is a blade next to the fourth blade 542a (4).

Figure 16B:
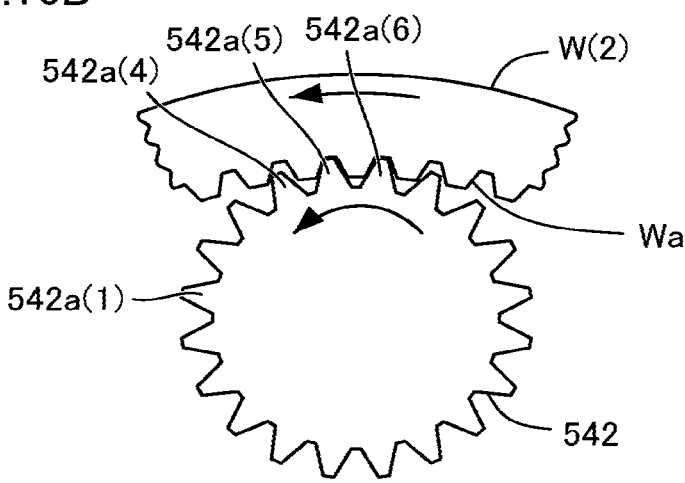
FIG. 16B is a drawing illustrating a second unit process in the machining of the second gear.

When the case where the second unit process (S43) is performed, teeth Wa as illustrated in FIG. 16B are formed on the second gear W (2). The groove depth of the teeth Wa at this time is on the order of ⅔ the depth of the grooves of the teeth Wa which are finally formed. When the second unit process is terminated (S44: Yes), since machining of the second gear W (2) is not terminated, the blade number N is incremented by 1 again (S46), and the third unit process is performed (S43).

In the third unit process (S43), the fourth gear cutting tool 542 is positioned at a deeper position in the cutting direction of the second gear W (2) than that positioned in the second unit process. Here, in the plurality of blades 542a of the fourth gear cutting tool 542, the blade to start machining in the third unit process (S43) is a sixth blade 542a(6) illustrated in FIG. 16C. Here, the sixth blade 542a (6) is different from the blades 542a (1) to 542a (5) for starting machining in other unit process. In this embodiment, the sixth blade 542a (6) is a blade next to the fifth blade 542a (5).

Figure 16C:
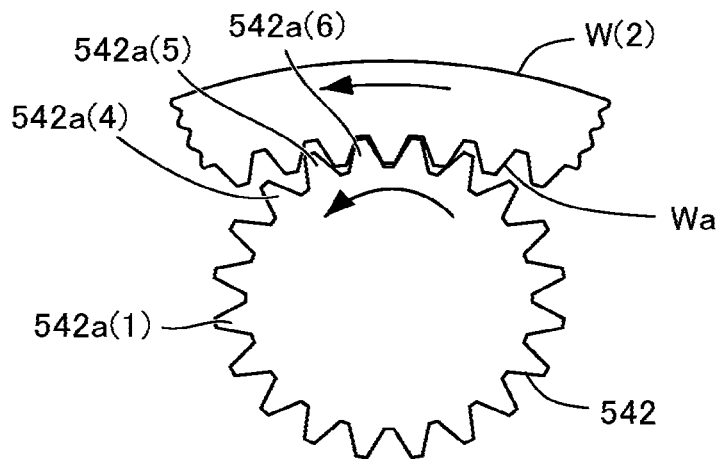
FIG. 16C is a drawing illustrating a third unit process in the machining of the second gear.

When the third unit process (S43) is performed, teeth Wa, which has a final desired shape as illustrated in FIG. 16C, are formed on the second gear W (2). In other words, machining of the second gear W (2) is terminated (S45: Yes).

4-3. Main Spindle Load at the time of Machining

Figure 17:
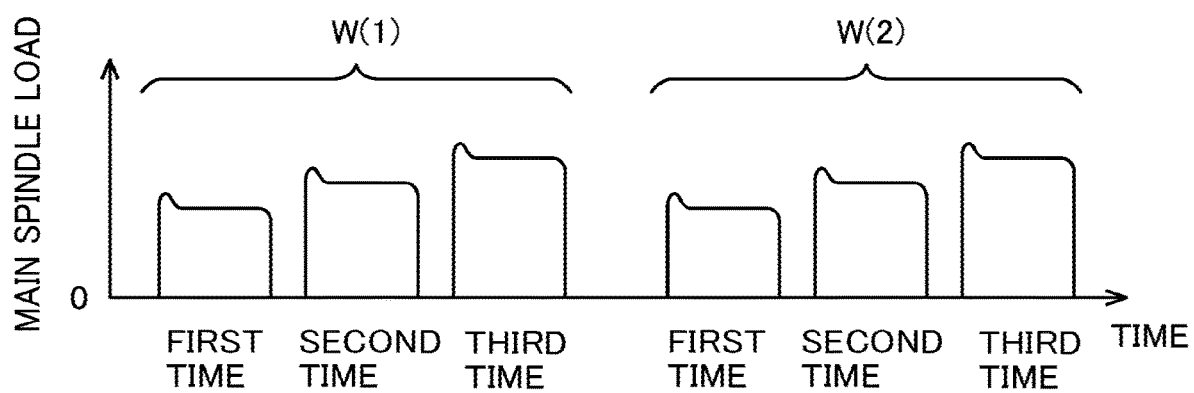
FIG. 17 is a drawing illustrating a load applied to a rotary main spindle when machining the first gear and the second gear in sequence.

A load applied to the rotary main spindle 40 when machining the first gear W (1) and the second gear W (2) described above will be described with reference to FIG. 17. As illustrated in FIG. 17, a load in the second unit process is larger than in the first unit process when machining the first gear W (1). A load in the third unit process is larger than in the second unit process. It is because machining amount per unit time in the second time is larger than that in the first time, and machining amount per unit time in the third time is larger than that in the second time as illustrated in FIG. 15A to FIG. 15C.

In the unit process of each time of machining of the first gear W (1), a load at the time of starting machining is the largest. Therefore, the load at the time of starting machining in the third unit process becomes the largest also in the machining of the first gear W (1). The same applies to the second gear W (2).

Here, in the machining of the first gear W (1), when starting machining in the first unit process, the first blade 542a (1) is used for machining. When starting the second unit process, the second blade 542a (2) is used for machining. When starting the third unit process, the third blade 542a (3) is used for machining.

In other words, in the machining of the first gear W (1), the blades 542a (1) to 542a (3) used for starting machining in the first, second, and third unit processes are different from each other. Therefore, a large load is not applied continuously on a specific blade 542a, and the load is dispersed to the plurality of blades 542a. Therefore, the elongation of the service life of the fourth gear cutting tool 542 is achieved.

In the machining of the second gear W (2), when starting machining in the first unit process, the fourth blade 542a (4) is used for machining. When starting the second unit process, the fifth blade 542a (5) is used for machining. When starting the third unit process, the sixth blade 542a (6) is used for machining.

In other words, in the machining of the second gear W (2), the blades 542a (4) to 542a (6) used for starting machining in the first, second, and third unit processes are different from each other. Furthermore, in the second gear W (2), the blades 542a (4) to 542a (6) used for machining when starting machining in the respective unit processes are different from the blades 542a (1) to 542a (3) used for machining when starting machining in the respective unit processes in the first gear W (1). Therefore, when machining the plurality of gears W, a large load is not applied continuously on the specific blade 542a, and the load is dispersed to the plurality of blades 542a. Therefore, the elongation of the service life of the fourth gear cutting tool 542 is achieved.

In this embodiment, the first gear W (1) and the second gear W (2) are machined in three times of unit processes (machining process is divided into three) respectively. However, the number of times is not limited to the three times, and twice and four times are also applicable. It is also possible to replace the tool after machining of external teeth on the single gear W has performed and continue machining of the internal teeth by the method described above. In other words, machining of external teeth and machining of internal teeth for one gear W may be performed with the single gear machining device 1, and the elongation of the service life of the fourth gear cutting tool 542 is achieved for machining the external teeth and the internal teeth, respectively.

4-4. Advantageous Effects of Fourth Embodiment

The gear machining method in the embodiment described above is a method of machining the gear W by moving the fourth gear cutting tool 542 having a plurality of blades 542a relatively to the gear W in a predetermined direction while rotating the gear W to be machined and the fourth gear cutting tool 542 having the plurality of blades 542a respectively. Here, a machining step in which the fourth gear cutting tool 542 is moved relatively to the gear W in the predetermined direction once is defined as a unit process. The first blade (542a (1)) for starting machining in the first unit process (S33 for the first time) and the second blades (542a (2), 542a (4)) for starting machining in the second unit process (S33 for the second time and S43 for the first time) in the plurality of blades 542a of the fourth gear cutting tool 542 are different.

Here, as illustrated in FIG. 17, the blade 542a for machining the gear W to be machined firstly in the unit process, that is, the blade 542a for starting machining in the unit process is subjected to the largest load. Therefore, when the unit process is repeated by a plurality of times, if the same blade 542a is the blade 542a used for starting machining in the respective unit processes every time, the corresponding blade 542a is continuously subjected to a large load.

However, according to the gear machining method of this embodiment, the first blade (542a (1)) for starting machining in the first unit process (S33 for the first time) and the second blades (542a (2), 542a (4)) for starting machining in the second unit process (S33 for the second time and S43 for the first time) are different. Therefore, in the first unit process (S33 for the first time), the load applied to the first blade (542a (1)) becomes the largest. In contrast, in the second unit process (S33 for the second time and S43 for the first time), the lords applied to the second blades (542a (2), 542a (4)) become the largest. In this manner, since the blade 542a being subjected to a large load is different from one unit process to another, the specific blade 542a is prevented from being applied always with a large load. Therefore, the elongation of the service life of the fourth gear cutting tool 542 is achieved.

In this embodiment, the unit process includes a step (S33a, S43a) of positioning the gear W and the fourth gear cutting tool 542 at initial positions, and a step (S33b, S43b) of machining the gear W by the fourth gear cutting tool 542 by moving the fourth gear cutting tool 542 in a predetermined direction once relatively to the gear W while rotating the gear W and the fourth gear cutting tool 542 respectively from the initial positions. In this case, a phase of the fourth gear cutting tool 542 at the initial position in the first unit process (S33 for the first time) and a phase of the fourth gear cutting tool 542 at the initial position in the second unit process (S33 for the second time, S43 for the first time) are different.

In this manner, by setting the phase of the fourth gear cutting tool 542 at the initial position, the first blade (542a (1)) for starting machining in the first unit process (S33 for the first time) and the second blades (542a (2), 542a (4)) for starting machining in the second unit process (S33 for the second time and S43 for the first time) in the plurality of blades 542a of the fourth gear cutting tool 542 may be differentiated easily.

The gear machining method of this embodiment is a method of machining the single gear (first gear W (1)) to be machined by a plurality of times of unit processes (S33) as illustrated in FIG. 15A to FIG. 15C. In this case, the first gear W (1) is machined by performing the first unit process (S33 for the first time), and the second unit process (S33 for the second time) after the first unit process (S33 for the first time). The first blade (542a (1)) for starting machining in the first unit process (S33 for the first time) for machining the first gear W (1) and the second blade (542a (2)) for starting machining in the second unit process (S33 for the second time) for machining the first gear W (1) are different.

In this manner, when the first gear W (1) is machined by the plurality of times of unit processes (S33), the blades 542a for starting machining in the respective unit process (S33) are different. Therefore, since the blade 542a being subjected to a large load is different from one unit process to another in the machining of the first gear W (1), the specific blade 542a is prevented from being applied always with a large load. Therefore, the elongation of the service life of the fourth gear cutting tool 542 is achieved.

The gear machining method of this embodiment is a method of machining the plurality of gears W (1), W (2) to be machined as illustrated in FIG. 15A and FIG. 16A. In this case, the first unit process is a process for machining the first gear W(1) (S33), and the second unit process is a process of machining the second gear W (2), which is different from the first gear W (1). The first blade 542a (1) for starting machining in the first unit process (S33 for the first time) when machining the first gear W (1) and the second blade 542a (4) for starting machining in the second unit process (S43 for the first time) when machining the second gear W (2) are different.

In this manner, the blades 542a for starting machining in the respective unit processes (S33, S43) when machining the first gear W (1) and the second gear W (2) are different. Therefore, since the blade 542a being subjected to a large load is different from one unit process to another in the machining of the first gear W (1) and the second gear W (2), the specific blade 542a is prevented from being applied always with a large load. Therefore, the elongation of the service life of the fourth gear cutting tool 542 is achieved.

Here, as described above, the gear machining method of this embodiment is a skiving method which machines the gear W with the fourth gear cutting tool 542 by moving the fourth gear cutting tool 542 relatively to the gear W in the direction of the center axis L1 (M2) of the gear W. In the case where the skiving is applied, the elongation of the service life of the fourth gear cutting tool 542 is reliably achieved.

In addition, in the fourth embodiment, the fourth gear cutting tool 542 may be replaced by the first gear cutting tool 42 of the first embodiment, the second gear cutting tool 242 of the second embodiment, and the third gear cutting tool 320 of the third embodiment. In this configuration, in addition to the advantageous effects described in the fourth embodiment, advantageous effects described in the first embodiment, the second embodiment, and the third embodiment are also achieved.

The invention claimed is:
1. A gear cutting tool used for machining a gear, comprising:
  a tool body including a plurality of blades on an outer peripheral surface thereof, a recessed portion on a distal end, and a center hole opening to the recessed portion; and
  a nozzle including a flow channel allowing a coolant liquid supplied to the center hole of the tool body to flow therein and discharging the coolant liquid toward the plurality of blades and provided in the center hole of the tool body so that a fixed position thereof in the tool body is adjustable,
  wherein the nozzle includes a shaft portion and a head portion having a diameter greater than the shaft portion,
  wherein a part of the head portion protrudes beyond an opening of the recessed portion in an axial direction,
  wherein the entire flow channel, from an inlet of the nozzle in the shaft portion where the coolant liquid enters the nozzle to an outlet of the nozzle in the part of the head portion protruding beyond the opening of the recessed portion where the coolant liquid exits the nozzle, is moved when the fixed position of the nozzle in the tool body is adjusted,
  wherein at least a portion of the outlet of the nozzle forming the entire flow channel protrudes beyond the opening of the recessed portion,
  wherein the center hole includes a female screw portion, wherein the recessed portion has a diameter larger than that of the female screw portion, wherein the tool body includes a mounting seat formed in a periphery of an opening of the center hole of the tool body, wherein the shaft portion is fastened in a state of being inserted into the center hole of the tool body, and includes a first flow channel extending in the axial direction as part of the flow channel, wherein the head portion is provided at an end of the shaft portion, is provided outside the opening of the center hole of the tool body, and includes a second flow channel discharging the coolant liquid flowed into the first flow channel radially outward as another part of the flow channel, wherein the gear cutting tool includes a spacer interposed between the mounting seat and the head portion in the axial direction, wherein the nozzle is provided in the center hole of the tool body so that the fixed position thereof in the tool body is adjustable by the spacer, and wherein the second flow channel discharges the coolant liquid directly toward the plurality of blades.

2. The gear cutting tool according to claim 1,
wherein the tool body includes:
a shaft member to be rotated about a center axis of the gear cutting tool; and
a blade portion provided on the shaft member coaxially therewith, and
wherein the blade portion includes:
a first cutting blade having a rake face facing one side in a direction of the center axis of the blade portion; and
a second cutting blade having a rake face facing another side in the direction of the center axis of the blade portion.

3. The gear cutting tool according to claim 2, wherein
the first cutting blade is used when moving the gear cutting tool relative to the gear to the one side in the direction of the center axis of the gear, and
the second cutting blade is used when moving the gear cutting tool relative to the gear to the other side in the direction of the center axis of the gear.

4. The gear cutting tool according to claim 1, wherein all of the outlet of the nozzle forming the entire flow channel protrudes beyond the opening of the recessed portion.

* * * * *